(12) United States Patent
Chakraborty et al.

(10) Patent No.: US 12,335,359 B2
(45) Date of Patent: *Jun. 17, 2025

(54) CORRELATING SIMULATED SIGNAL AND SATELLITE DOWNLINK SIGNAL

(71) Applicant: Microsoft Technology Licensing, LLC, Redmond, WA (US)

(72) Inventors: Tusher Chakraborty, Bangalore (IN); Ranveer Chandra, Kirkland, WA (US); Nissanka Arachchige Bodhi Priyantha, Redmond, WA (US); Vaibhav Singh, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,660

(22) Filed: Apr. 15, 2024

(65) Prior Publication Data
US 2024/0283854 A1 Aug. 22, 2024

Related U.S. Application Data

(63) Continuation of application No. 18/057,066, filed on Nov. 18, 2022, now Pat. No. 11,997,184.

(51) Int. Cl.
*G06F 15/173* (2006.01)
*H04B 7/08* (2006.01)
*H04L 69/00* (2022.01)
*H04L 69/22* (2022.01)

(52) U.S. Cl.
CPC ........... *H04L 69/22* (2013.01); *H04B 7/0854* (2013.01); *H04L 69/03* (2013.01)

(58) Field of Classification Search
CPC ........ H04L 69/22; H04L 69/03; H04B 7/0854
USPC ......................................................... 709/224
See application file for complete search history.

(56) References Cited

U.S. PATENT DOCUMENTS 11,997,184 B1 * 5/2024 Chakraborty ...... H04B 7/18576
2023/0413203 A1 * 12/2023 Ryu .................. H04W 74/0833

* cited by examiner

*Primary Examiner* — Alan S Chou
(74) *Attorney, Agent, or Firm* — Alleman Hall & Tuttle LLP

(57) ABSTRACT

A computing system including a processor configured to receive packet preamble binary data and packet header binary data associated with a satellite. The processor may generate a simulated signal that encodes the packet preamble binary data and the packet header binary data. The processor may receive a satellite downlink signal. Within each of a plurality of sample intervals of the satellite downlink signal, the processor may compute a respective correlation between the satellite downlink signal and at least a portion of the simulated signal. The processor may select an identified sample interval of the plurality of sample intervals based at least in part on the plurality of correlations. The processor may decode binary satellite signal data based at least in part on the identified sample of the satellite downlink signal. The processor may output the binary satellite signal data.

20 Claims, 16 Drawing Sheets

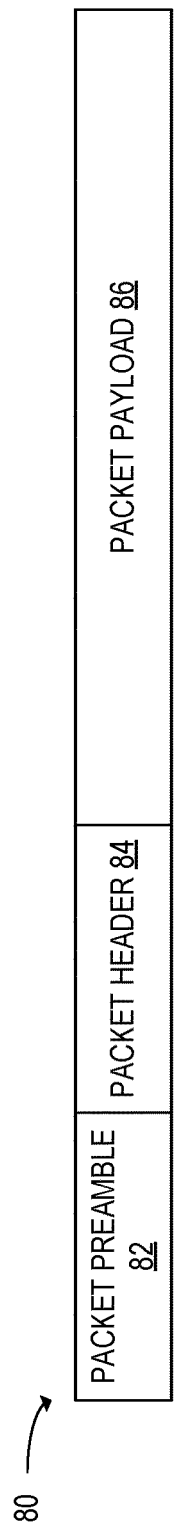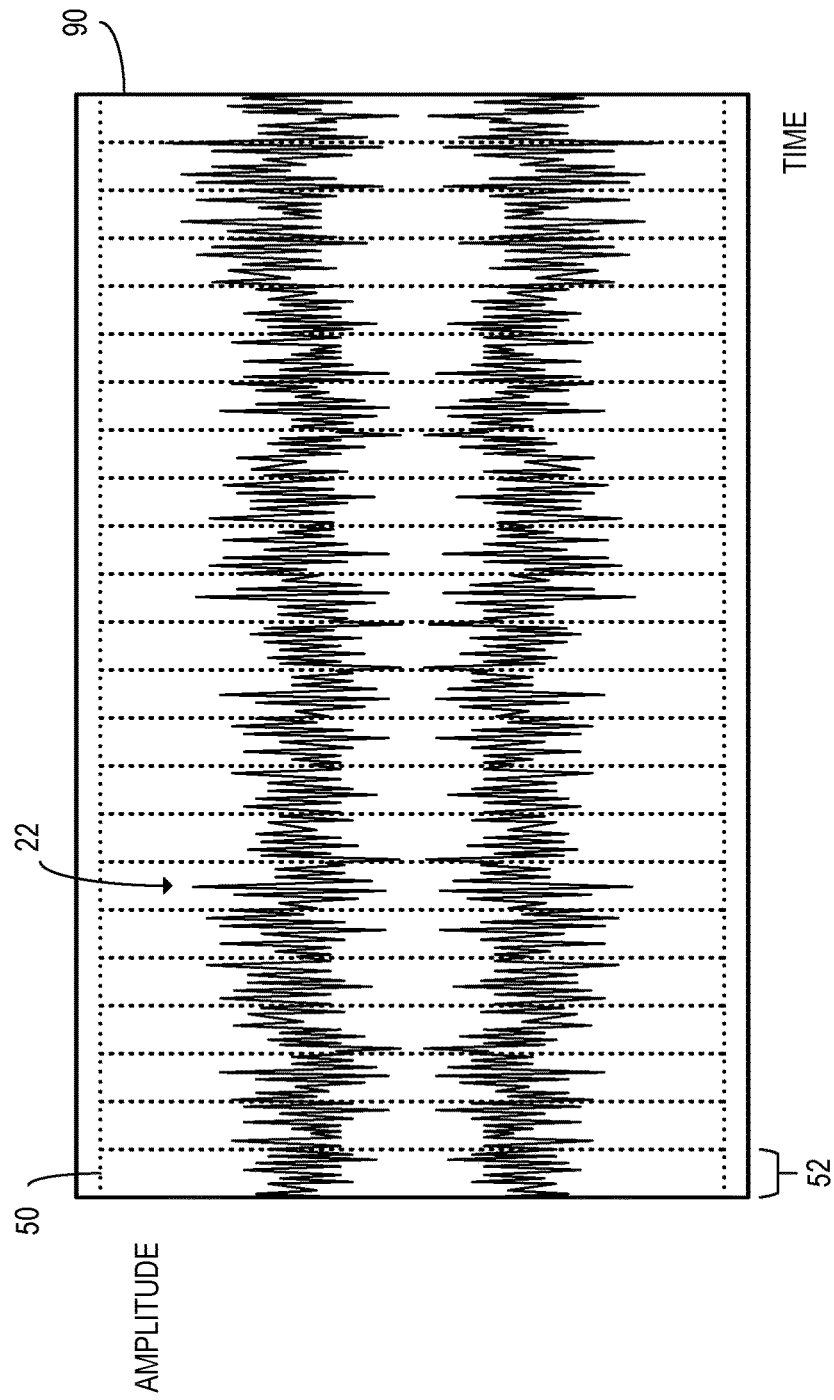

Algorithm 1: Algorithm for locating and decoding packet from raw SDR signal

```
INIT rawSamplePacketBegin TO null;
INIT corealtionResults[] TO null;
INIT corelationThreshold TO SEED_THRESHOLD;
INIT maxCorelationPoint TO null;
INIT countBelowThrsldCheck TO 0;
INIT timeDelta TO TIME_GAP_BETWEEN_PACKETS;
GET rawSamplePacketBegin FROM
  Generate_Raw_SDR_Sample(modulationConfig, preambleLength, header);
GET corealtionResults[] FROM Run_Corelation(receivedSignalSamples,
  rawSamplePacketBegin);
while Count(corealtionResults[]) > 0 do
    Max_Heapify(corealtionResults[]);
    SET maxCorelationPoint TO Pop_Max(corealtionResults[]);
    if maxCorelationPoint < corelationThreshold then
        countBelowThrsldCheck + +;
        if countBelowThrsldCheck > 5 then
         |  BREAK;
        end
    end
    SET packetStartPosition TO maxCorelationPoint.positionInRecordSignal;
    while true do
        if Is_Compatible_In_FrequencyDomain(packetStartPosition, preambleLength)
           == true then
            GET decodedTentativePreamble FROM
              Decode_Packet_WithAdditionalWindow(packetStartPosition,
              preambleLength, modulationConfig);
            if Match_DecodedPreamble(decodedTentativePreamble, preambleLength,
              modulationConfig, REF packetStartPosition) == true then
                Decode_Packet(packetStartPosition, modulationConfig);
                SET rmsdCorelationValue TO
                  Heap_Remove(Get_CorelationPointIndex(packetStartPosition,
                  corealtionResults[]));
                if rmsdCorelationValue < corelationThreshold then
                    SET corelationThreshold TO rmsdCorelationValue;
                    SET countBelowThrsldCheck TO 0;
                end
                Move_PacketPosition(REF packetStartPosition, timeDelta);
            else
             |  BREAK;
            end
        else
         |  BREAK;
        end
    end
end
SET SEED_THRESHOLD TO corelationThreshold;
```

FIG. 9

CORRELATING SIMULATED SIGNAL AND SATELLITE DOWNLINK SIGNAL

CROSS REFERENCE TO RELATED APPLICATIONS

This application is a continuation of U.S. patent application Ser. No. 18/057,066, filed Nov. 18, 2022, the entirety of which is hereby incorporated herein by reference for all purposes.

BACKGROUND

Increasing numbers of small satellites known as CubeSats have recently been deployed into orbit around the Earth. These satellites are designed to have low costs, low power consumption levels, and small form factors. CubeSats are typically deployed in constellations of multiple satellites (e.g., of approximately 150 satellites) that typically follow similar orbits. In addition, CubeSats are configured to transmit data to ground stations located on the Earth, at which the downlinked data may be processed or offloaded for processing at other locations. The signals transmitted from CubeSats to ground stations are typically transmitted in the form of radio waves that encode data packets. The radio waves are converted into digital signals during processing in order to extract the encoded data.

SUMMARY

According to one aspect of the present disclosure, a computing system is provided, including a processor configured to receive packet preamble binary data and packet header binary data associated with a satellite. The processor may be further configured to generate a simulated signal that encodes the packet preamble binary data and the packet header binary data. The processor may be further configured to receive a satellite downlink signal. Within each of a plurality of sample intervals of the satellite downlink signal, the processor may be further configured to compute a respective correlation between the satellite downlink signal and at least a portion of the simulated signal. The processor may be further configured to select an identified sample interval of the plurality of sample intervals based at least in part on the plurality of correlations. The processor may be further configured to decode binary satellite signal data based at least in part on the identified sample of the satellite downlink signal. The processor may be further configured to output the binary satellite signal data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 schematically shows an example packet configured to be received at the computing system from the satellite, according to the example of FIG. 1.

FIG. 4 shows an example plot of the amplitude of a satellite downlink signal over time, according to the example of FIG. 1.

FIG. 9 shows an example algorithm that may be performed at a processor of the computing system to locate and decode a packet in a satellite downlink signal, according to the example of FIG. 1.

DETAILED DESCRIPTION

Existing methods of decoding downlinked CubeSat data typically have high packet loss rates. For example, the rate at which data packets are successfully decoded from downlinked signals may be approximately 10%. This low decoding rate may at least partially be the result of low signal transmission power of the CubeSats. As another contributor to the low decoding rate, CubeSats included in the same constellation may be located in closely spaced orbits, and the beams in which the CubeSats transmit data to the ground stations may be wide (e.g., on the order of hundreds or thousands of miles in diameter). Thus, the beams transmitted by the CubeSats may interfere with each other. Terrestrial radio sources may also be a source of noise in the signals received at ground stations. In addition, the challenges with signal strength and interference discussed above may be exacerbated by low elevation angles of the CubeSats above the horizon signal and/or by obstruction of downlinked signals due to weather.

Figure 1:
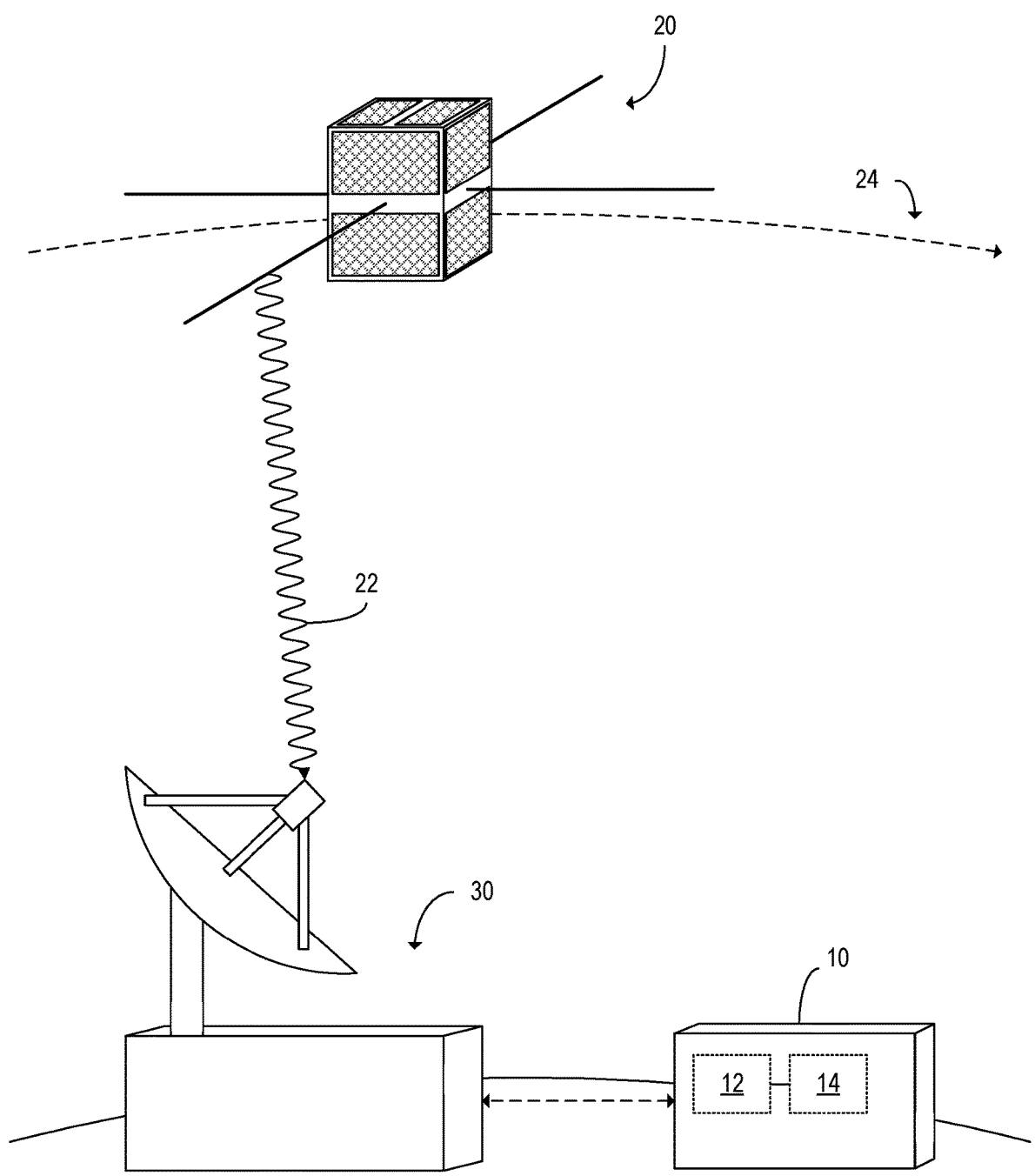
FIG. 1 shows a computing system, a satellite, and a ground station, according to one example embodiment.

In order to address the above challenges, a computing system 10 is provided, as shown in the example of FIG. 1. FIG. 1 further shows a satellite 20 and a ground station 30. The computing system 10 and the ground station 30 shown in the example of FIG. 1 are located on the Earth, while the satellite 20 is in an orbit 24. For example, the satellite 20 may be located in low Earth orbit (LEO). The satellite 20 may be included in a constellation of a plurality of satellites 20.

As discussed in further detail below, the computing system may be configured to process a satellite downlink signal 22 received at the ground station 30 from the satellite 20. In some examples, the computing system 10 may be located at the ground station 30. Alternatively, the computing system 10 may be located apart from the ground station 30 and may be configured to receive the satellite downlink signal 22 from the ground station 30 via a wired or wireless connection. For example, the computing system 10 may include one or more server computing devices located at a data center where the satellite downlink signal 22 is configured to be processed in a cloud computing environment.

The computing system 10 may include a processor 12 that is communicatively coupled to memory 14. Other components, such as one or more user input devices and/or one or more user output devices, may also be included in the computing system 10 in some examples. Although the computing system 10 is depicted in the example of FIG. 1 as a single physical computing device, the functionality of the processor 12 and/or the memory 14 may alternatively be distributed between a plurality of physical computing devices.

Figure 2:
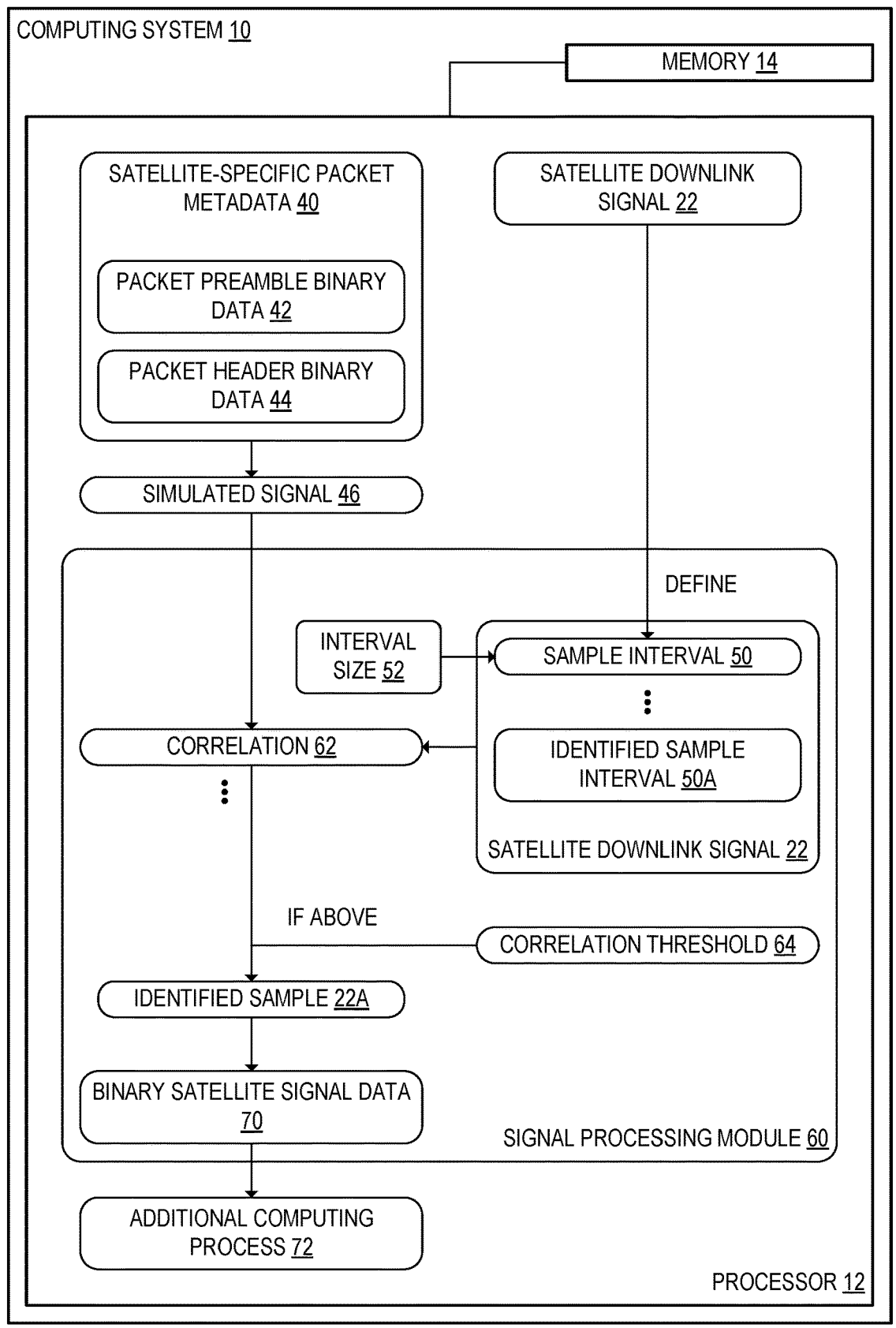
FIG. 2 schematically depicts the computing system when satellite-specific packet metadata and a satellite downlink signal are processed at a processor, according to the example of FIG. 1.

FIG. 2 schematically depicts the computing system 10 when satellite-specific packet metadata 40 and the satellite downlink signal 22 are processed at the processor 12. As shown in FIG. 2, the processor 12 may be configured to receive satellite-specific packet metadata 40 including receive packet preamble binary data 42 and packet header binary data 44 associated with the satellite 20. The satellite-specific packet metadata 40 may be received in a setup phase prior to processing the satellite downlink signal 22. In some examples, the processor 12 may be configured to receive the satellite-specific packet metadata 40 prior to launch of the satellite 20.

FIG. 3 schematically shows an example packet 80 configured to be received at the computing system 10 from the satellite. In the example of FIG. 3, the packet 80 is shown subsequently to decoding at the processor 12. The packet 80 may begin with a packet preamble 82. The data included in the packet preambles 82 of respective packets 80 may, in some examples, be identical for each packet 80 included among a plurality of packets 80 transmitted to the ground station 30 by the satellites 20 included in a satellite constellation.

The packet 80 may further include a packet header 84 located after the packet preamble 82. The packet header 84 may, for example, include a satellite identifier that is unique to a specific satellite 20 among the plurality of satellites 20 in the constellation. Thus, the packet header 84 may be used to identify which of the satellites 20 transmitted the packet 80. In some examples, additional metadata such as a node address of the ground station 30 may be included in the packet header 84.

The packet 80 may further include a packet payload 86 following the packet header 84. In some examples, the respective packet payloads 86 of the packets 80 received from the satellites 20 at the ground station 30 may each have a fixed size. In other examples, the packet payloads 86 may be of variable size. In examples in which the packet payloads 86 have variable sizes, the size of the packet payload 86 may be indicated in the packet header 84.

Returning to FIG. 2, the packet preamble binary data 42 and the packet header binary data 44 may be bitstrings that respectively encode the packet preamble 82 and the packet header 84 of packets 80 configured to be received from the satellite 20. The processor 12 may, in some examples, be configured to receive separate satellite-specific packet metadata 40 for each satellite 20 in the constellation.

The processor 12 may be further configured to generate a simulated signal 46 that encodes the packet preamble binary data 42 and the packet header binary data 44 for the satellite 20. The processor 12 may, for example, be configured to generate the simulated signal 46 at least in part by replicating a signal encoding protocol by which the packet 80 is converted into the satellite downlink signal 22 at the satellite 20. Thus, the simulated signal 46 may simulate a noise-free version of the portion of the satellite downlink signal 22 that encodes the packet preamble 82 and the packet header 84.

As discussed above, the processor 12 may be further configured to receive the satellite downlink signal 22. For example, the satellite downlink signal 22 may be an in-phase quadrature (IQ) signal. The satellite downlink signal 22 may include one or more packets 80, but the locations of the packets 80 within the satellite downlink signal 22 may be obscured by noise. Accordingly, the processor 12 may be configured to determine the respective locations of one or more packets 80 within the satellite downlink signal 22 using the techniques provided below. The locations of the packets 80 may be computed at a signal processing module 60 executed at the processor 12.

Within each of a plurality of sample intervals 50 of the satellite downlink signal 22, the processor 12 may be configured to compute a respective correlation 62 between the satellite downlink signal 22 and at least a portion of the simulated signal 46. The sample intervals 50 may each have an interval size 52, which may be a predetermined amount of time. Thus, the total duration of the satellite downlink signal 22 may be divided into a plurality of sample intervals 50 that each have durations equal to the interval size 52. For example, the interval size 52 may be greater than or equal to the duration of the simulated signal 46. The correlation 62 may, for example, be a linear correlation. In other examples, some other correlation formula may be used to compute the correlation 62.

FIG. 4 shows an example plot 90 of the amplitude of a satellite downlink signal 22 over time. FIG. 4 further shows a plurality of sample intervals 50 into which the satellite downlink signal 22 is divided. The sample intervals 50 each have the interval size 52 in the example of FIG. 4. During processing of the satellite downlink signal 22, the processor 12 may be configured to compute the values of the correlation 62 for each of the sample intervals 50 such that the full range of the satellite downlink signal 22 is checked for correlation with the simulated signal 46.

Returning to FIG. 2, the processor 12 may be further configured to determine that an identified sample interval 50A of the plurality of sample intervals 50 has a correlation 62 with the simulated signal 46 that is above a predetermined correlation threshold 64. A correlation 62 above the predetermined correlation threshold 64 between the identified sample interval 50A and the simulated signal 46 may indicate that the identified sample interval 50A includes the packet preamble 82 and packet header 84. The steps by which the identified sample interval 50A may be selected are discussed in further detail below.

The processor 12 may be further configured to decode binary satellite signal data 70 included in the identified sample interval 50A that has the correlation 62 with the simulated signal 46 above the predetermined correlation threshold 64. The binary satellite signal data 70 may be the data included in the packet 80. Accordingly, after the location of the packet 80 within the satellite downlink signal 22 has been determined based on the correlation 62, the processor 12 may be further configured to convert the identified sample 22A of the satellite downlink signal 22 that encodes the packet 80 into binary data. In some examples, the identified sample 22A of the satellite downlink signal 22 configured to be decoded may be the sample of the satellite downlink signal 22 located within the identified sample interval 50A. In other examples, the identified sample 22A of the satellite downlink signal 22 may extend past the end of the identified sample interval 50A. The processor 12 may, for example, be configured to select the size of the identified sample 22A based at least in part on packet size data included in the packet header binary data 44.

Figure 5:
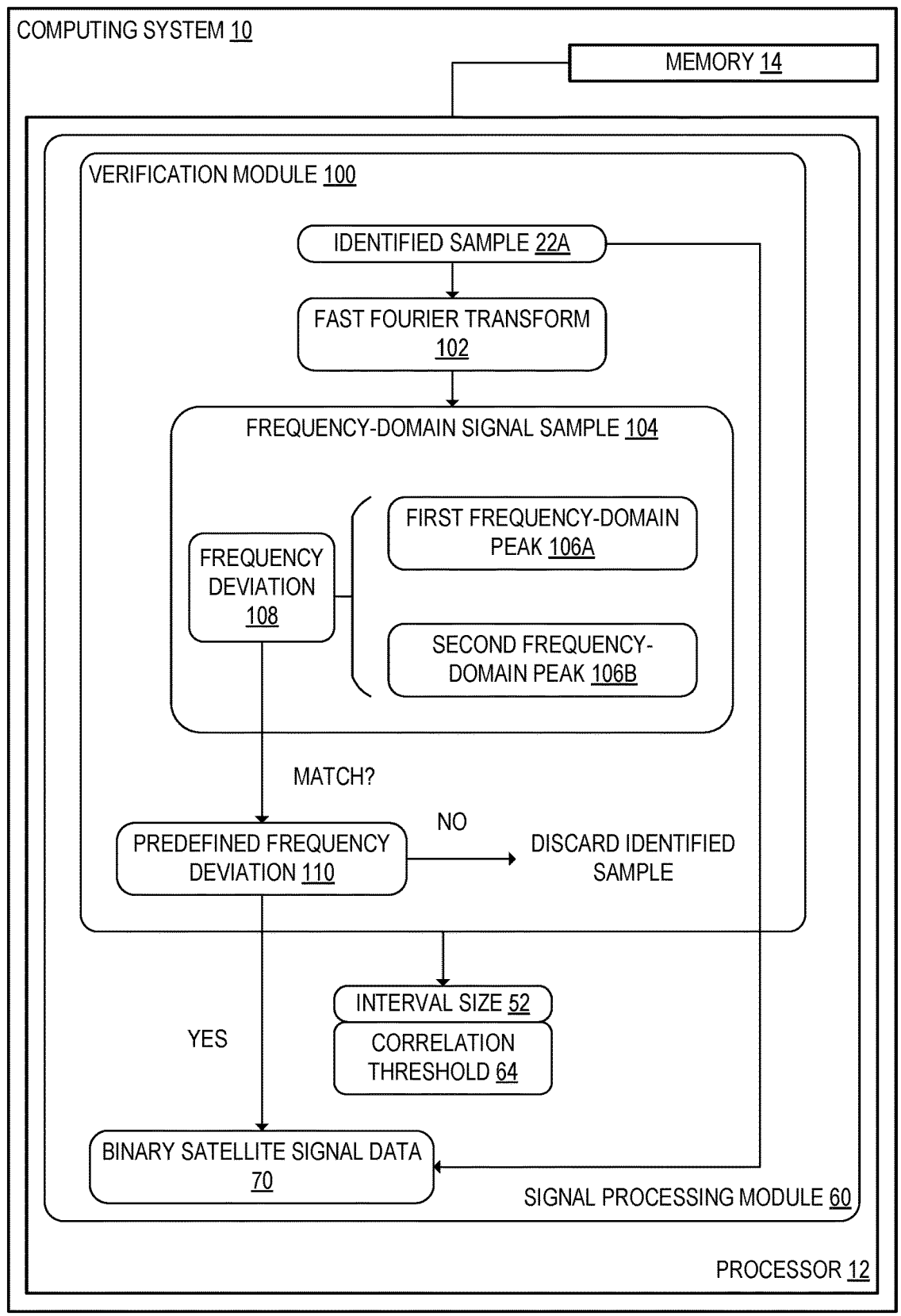
FIG. 5 schematically shows the computing system when the processor is configured to execute a verification module, according to the example of FIG. 1.

In some examples, as shown in FIG. 5, the processor 12 may be further configured to execute a verification module 100 on the identified sample 22A of the satellite downlink signal 22 subsequently to identifying the identified sample interval 50A. By executing the verification module 100, the processor 12 may be further configured to determine whether the identified sample interval 50A includes packet data or whether the identification of the identified sample interval 50A is a false positive. When the processor 12 executes the verification module 100, the processor 12 may be further configured to convert the identified sample 22A from the time domain into the frequency domain to obtain a frequency-domain signal sample 104. For example, as shown in FIG. 5, the processor 12 may be configured to generate the frequency-domain signal sample 104 at least in part by performing a fast Fourier transform on the identified sample 22A.

The processor 12 may be further configured to compute a frequency deviation 108 between a first frequency-domain peak 106A and a second frequency-domain peak 106B within the frequency-domain signal sample 104. The frequency deviation 108 is a distance in frequency space between the first frequency-domain peak 106A and the second frequency-domain peak 106B. Thus, when the frequency-domain signal sample 104 encodes a packet 80, the frequency-domain signal sample 104 may have a frequency deviation 108 between the first frequency-domain peak 106A and the second frequency-domain peak 106B that is approximately equal to a predefined frequency deviation 110. In the example of FIG. 5, the packet 80 is a Gaussian frequency-shift keying (GFSK) packet. The predefined frequency deviation may, for example, be 10 kHz. When the processor 12 determines that the identified sample 22A has a frequency deviation 108 that matches the predefined frequency deviation 110, the processor 12 may be configured to proceed to computing the satellite binary signal data 70 from the identified sample 22A. Otherwise, the processor 12 may be configured to discard the identified sample 22A as a false positive.

In some examples, the processor 12 may be further configured to update the interval size 52 and/or the predetermined correlation threshold 64 based at least in part on the determination made at the verification module 100. In such examples, when the processor 12 determines that the identification of the identified sample 22A is a false positive, the processor 12 may be configured to increase the interval size 52. When the processor 12 determines that the frequency deviation 108 approximately matches the predefined frequency deviation 110, the processor 12 may be configured to decrease the interval size 52. Setting the interval size 52 may allow the processor 12 to manage a tradeoff between false negatives and false positives in which decreasing the interval size 52 may decrease the false negative rate but increase the false positive rate. Conversely, increasing the interval size 52 may increase the false negative rate and decrease the false positive rate.

The processor 12 may also be configured to manage the tradeoff between the false negatives and false positives by adjusting the predetermined correlation threshold 64. Reducing the predetermined correlation threshold 64 may reduce the false negative rate and increase the false positive rate. Increasing the predetermined correlation threshold 64 may increase the false negative rate and decrease the false positive rate. Thus, when the processor 12 determines that the frequency deviation 108 approximately matches the predefined frequency deviation 110, the processor 12 may be configured to decrease the predetermined correlation threshold 64. When the processor 12 determines that the identification of the identified sample 22A is a false positive, the processor 12 may be configured to instead increase the predetermined correlation threshold 64.

In some examples, the processor 12 may be further configured to modify the interval size 52 of each of the plurality of sample intervals 50 based at least in part on the modification to the predetermined correlation threshold 64. When the predetermined correlation threshold 64 is lowered, the processor 12 may be configured to increase the interval size 52. Accordingly, the processor 12 may be configured to adjust the interval size 52 to be longer in order to account for an increase in the noise level when the predetermined correlation threshold 64 decreases. When the predetermined correlation threshold 64 is raised, the processor 12 may be configured to decrease the interval size 52. By decreasing the interval size 52, the processor 12 may account for a decrease in the noise level when the predetermined correlation threshold 64 increases.

Figure 6:
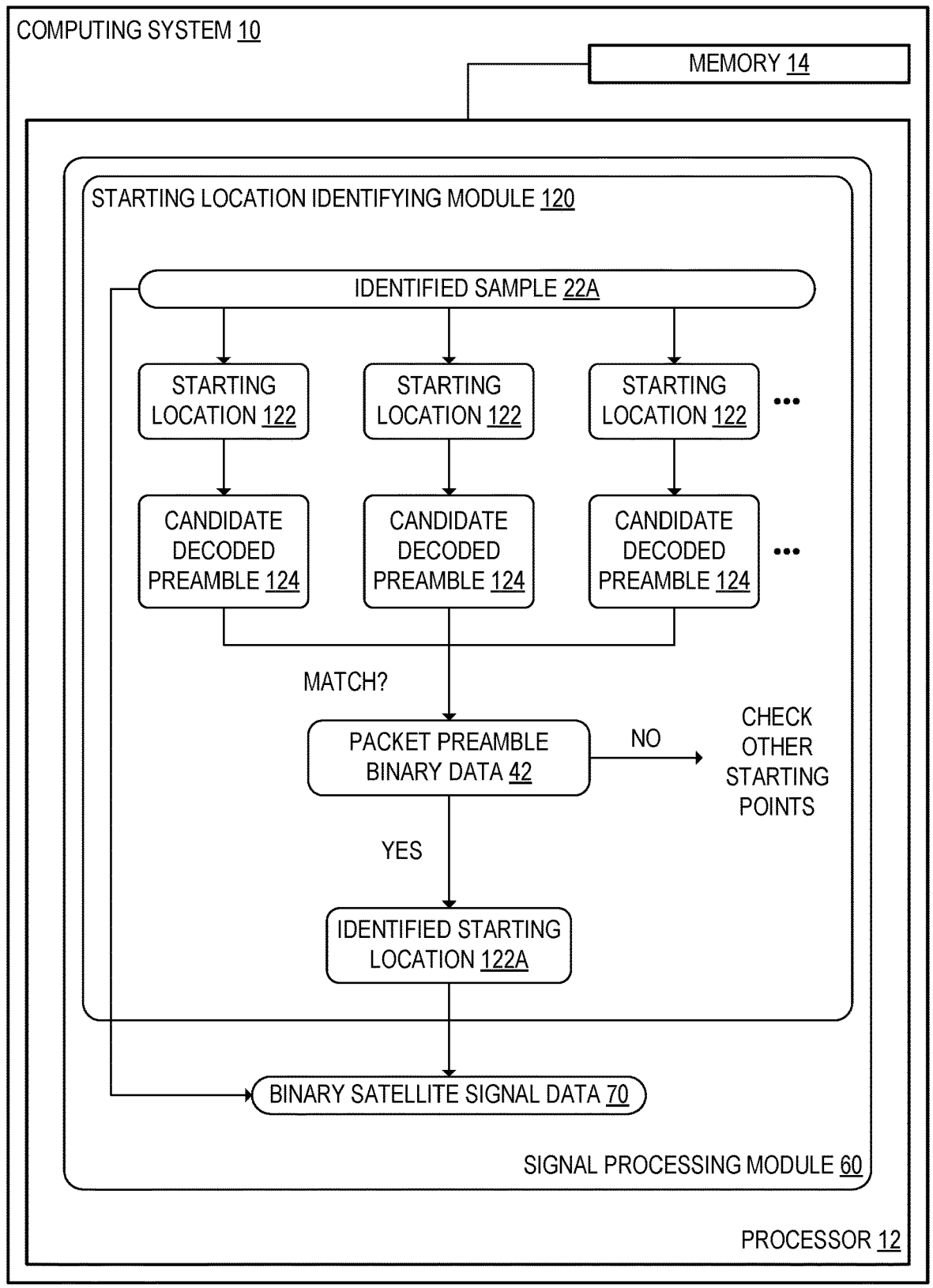
FIG. 6 schematically shows the computing system when the processor is configured to execute a starting location identifying module, according to the example of FIG. 1.

FIG. 6 schematically shows a starting location identifying module 120 that may be executed at the processor 12 in some examples to determine a location within the identified sample 22A at which the packet 80 begins. In some examples, the starting location identifying module 120 may be executed subsequently to the verification module 100. At the starting location identifying module 120, the processor 12 may be configured to compute a plurality of candidate decoded preambles 124 starting at a plurality of different starting locations 122 within the identified sample 22A of the satellite downlink signal 22. Each of the candidate decoded preambles 124 may be a bitstring.

The processor 12 may be further configured to check whether each of the candidate decoded preambles 124 matches the packet preamble binary data 42. The processor 12 may be configured to check the candidate decoded preambles 124 until the processor 12 identifies an identified starting location 122A for which the corresponding candidate decoded preamble 124 matches the packet preamble binary data 42. The processor 12 may be further configured to decode the identified sample 22A starting at the identified starting location 122A to compute the binary satellite signal data 70.

Figure 7A:
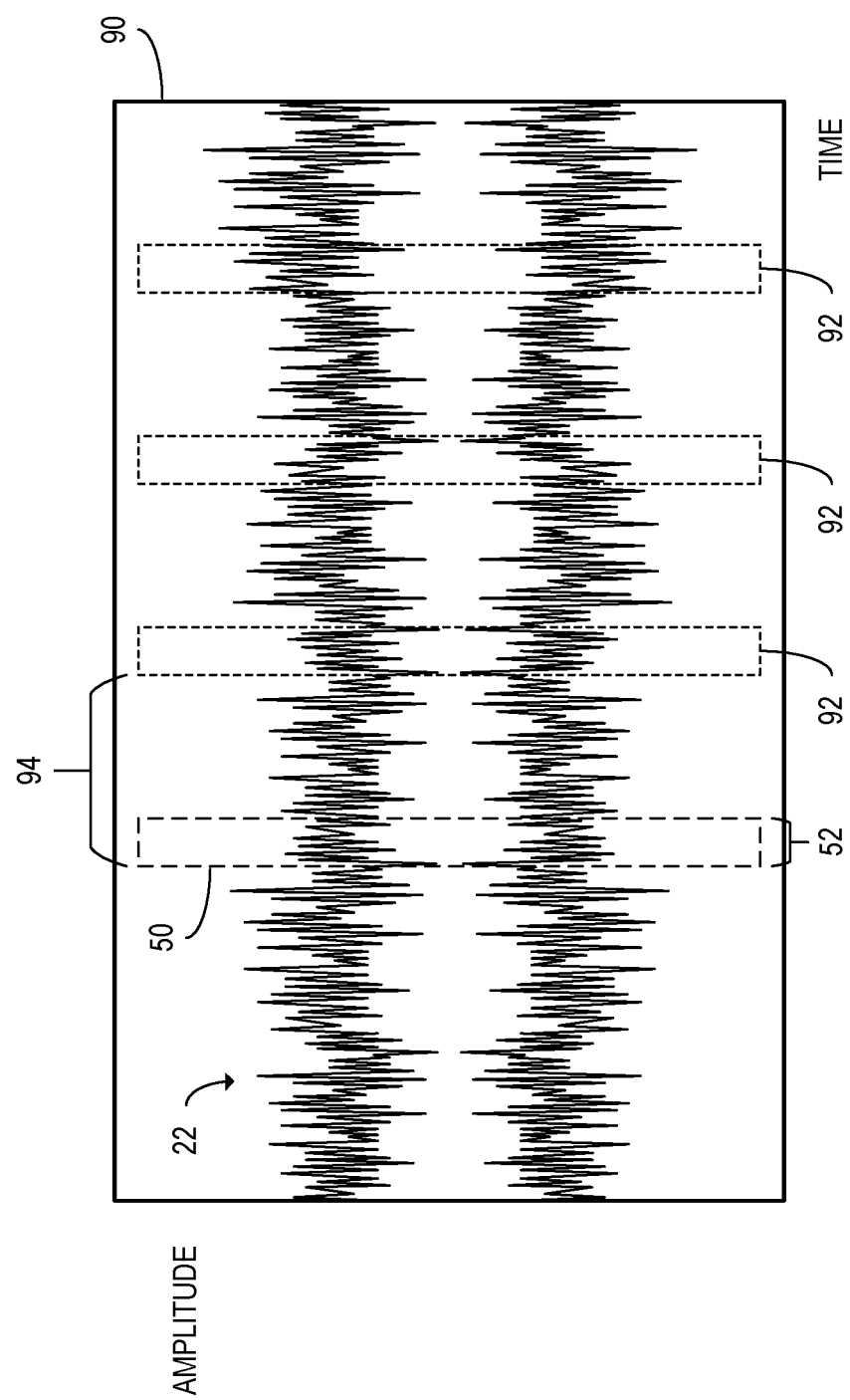
FIG. 7A shows the plot of FIG. 4 in an example in which a plurality of additional identified samples included in a respective plurality of additional sample intervals of the satellite downlink signal have been selected.

FIG. 7A shows the plot 90 of FIG. 4 in an example in which a plurality of additional identified samples 92 included in a respective plurality of additional sample intervals 94 of the satellite downlink signal 22 have been selected. As depicted in the example of FIG. 7A, the processor 12 may be further configured to select one or more additional sample intervals 94 in the satellite downlink signal 22 that are spaced apart from the identified sample interval 50A by one or more respective integer multiples of a predefined inter-packet time gap 96. The predefined inter-packet time gap 96 may, for example, be defined in the communication protocol via which the satellite 20 is configured to communicate with the ground station 30. As one example, the predefined inter-packet time gap 96 may be 30 seconds. Thus, the one or more additional sample intervals 94 may be sample intervals 50 that are expected to include additional packets 80.

Figure 7B:
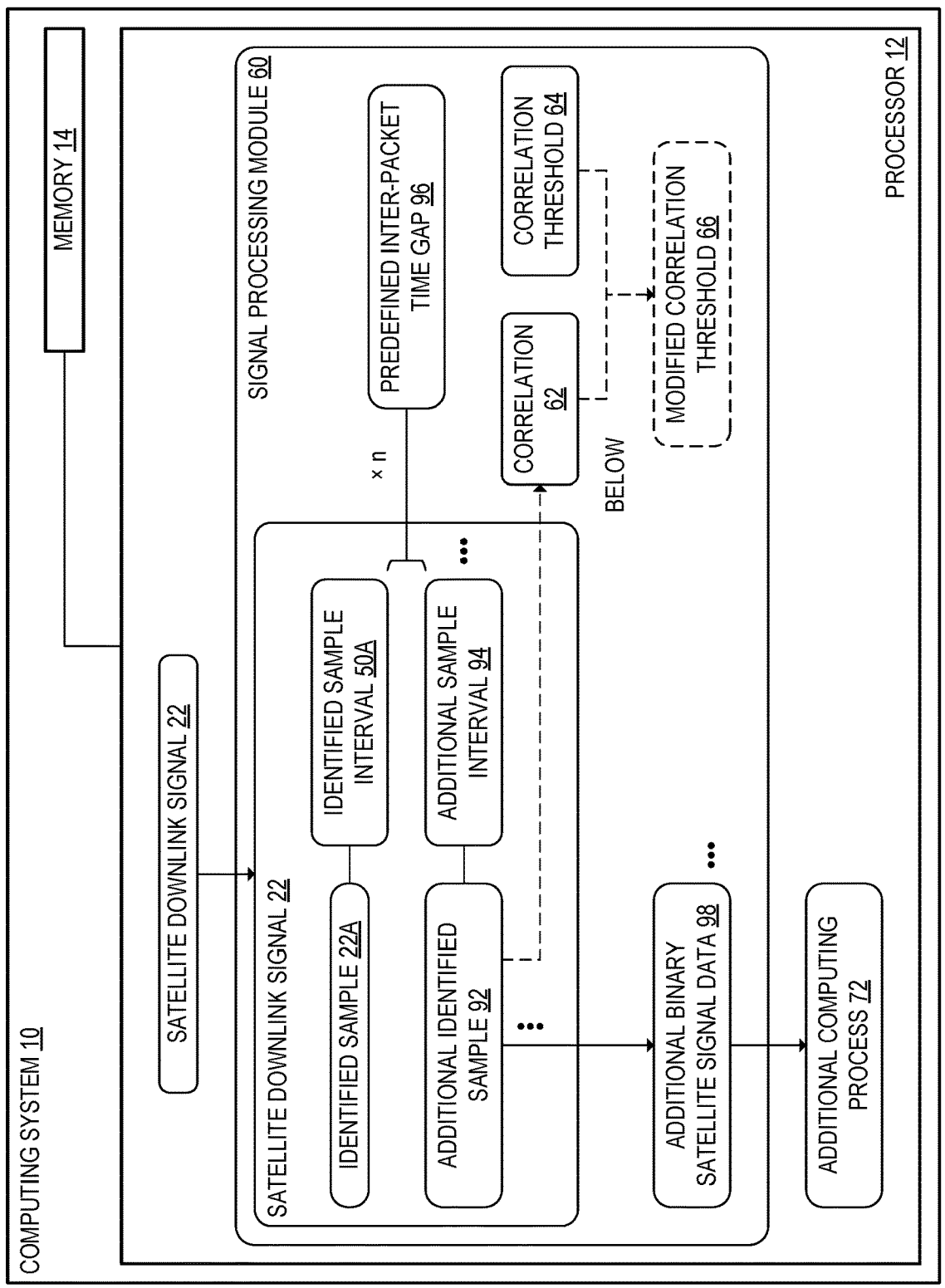
FIG. 7B schematically shows the computing system when the additional identified samples are processed, according to the example of FIG. 7A.

FIG. 7B shows the computing system 10 when the additional identified samples 92 are processed at the signal processing module 60. As shown in the example of FIG. 7B, each of the additional identified samples 92 may be spaced apart from the identified sample 22A by a respective integer n multiplied by the predefined inter-packet time gap 96. The processor 12 may be further configured to decode additional binary satellite signal data 98 based at least in part on the one or more additional identified samples 92 of the satellite downlink signal 22 located within the one or more additional sample intervals 94. The processor 12 may be further configured to output the additional binary satellite signal data 98 to the additional computing process 72.

Figure 7C:
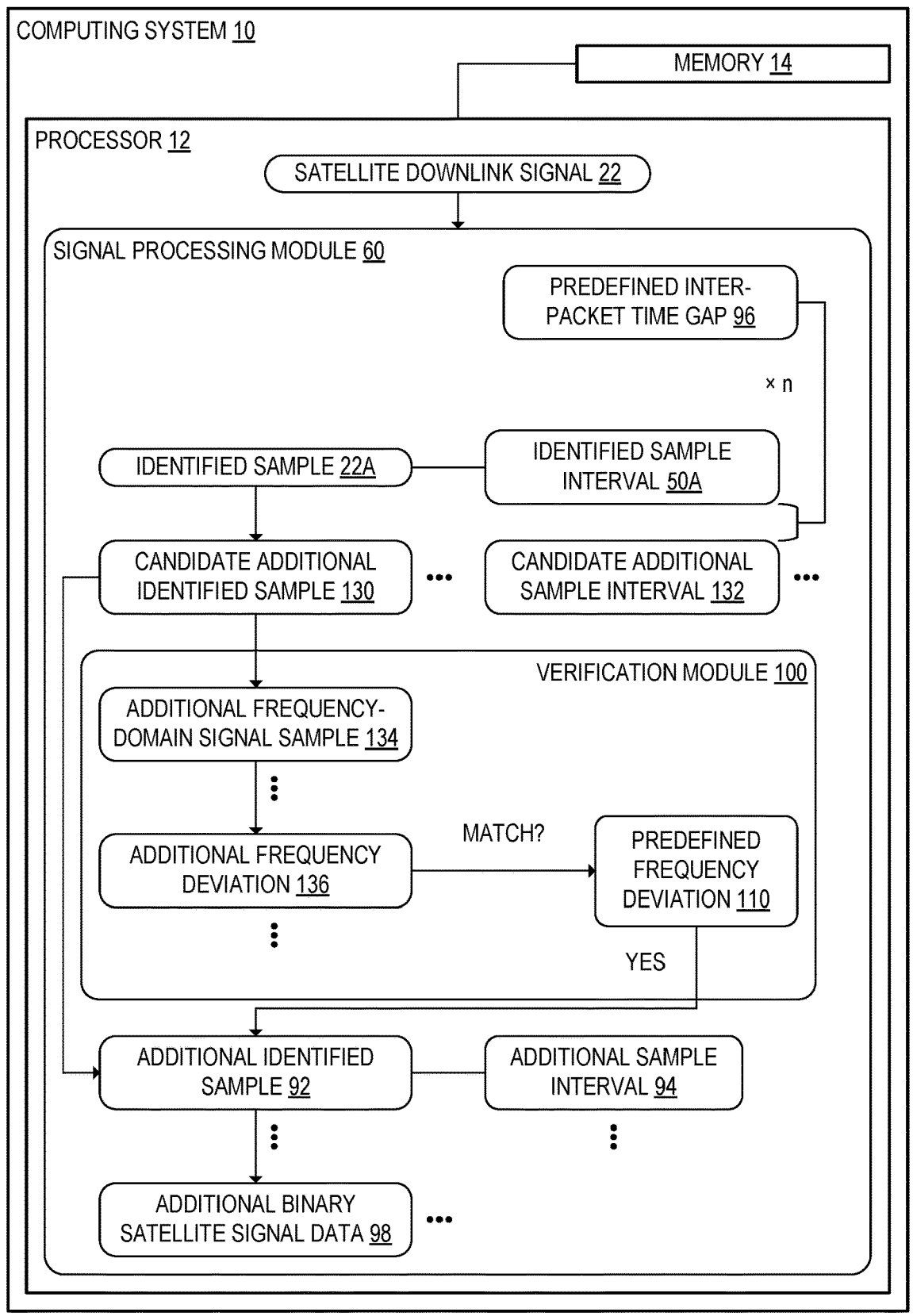
FIG. 7C schematically shows the computing system when the processor is configured to execute the verification module for a plurality of candidate additional identified samples, according to the example of FIG. 7B.

In some examples, as shown in FIG. 7C, selecting the one or more additional sample intervals 94 may include performing a frequency deviation check. At the verification module 100, the processor 12 may be further configured to compute a respective plurality of additional frequency-domain signal samples 134. The additional frequency-domain signal samples 134 may be computed based at least in part on a plurality of candidate additional identified samples 130 of the satellite downlink signal 22 located within a plurality of candidate additional sample intervals 132. The candidate additional identified samples 130 may be samples of the satellite downlink signal 22 that are spaced apart from the identified sample interval 50A by respective integer multiples of the predefined inter-packet time gap 96.

Subsequently to generating the additional frequency-domain signal samples 134, the processor 12 may be further configured to compute respective additional frequency deviations 136 of the plurality of additional frequency-domain signal samples 134. The processor 12 may be further configured to select, as the one or more additional sample intervals, one or more candidate additional sample intervals 132 of the plurality of candidate additional sample intervals 132 with respective additional frequency deviations 136 substantially equal to the predefined frequency deviation 110. Accordingly, the processor 12 may be configured to check the additional frequency deviations 136 of the candidate additional identified samples 130 at the verification module 100 during selection of the one or more additional identified samples 92 of the satellite downlink signal 22.

Returning to FIG. 7B, in some examples, the processor 12 may be further configured to determine that an additional identified sample 92 of the one or more additional identified samples 92 has a respective correlation 62 with the simulated signal 46 that is below the predetermined correlation threshold 64. Thus, the additional identified sample 92 may be a false negative. In response to determining that the correlation 62 of the additional identified sample 92 is below the predetermined correlation threshold 64, the processor 12 may be further configured to set the predetermined correlation threshold 64 to the correlation 62 associated with the additional identified sample 92. The processor 12 may accordingly be configured to lower the predetermined correlation threshold 64 when a false negative is detected.

Figure 8:
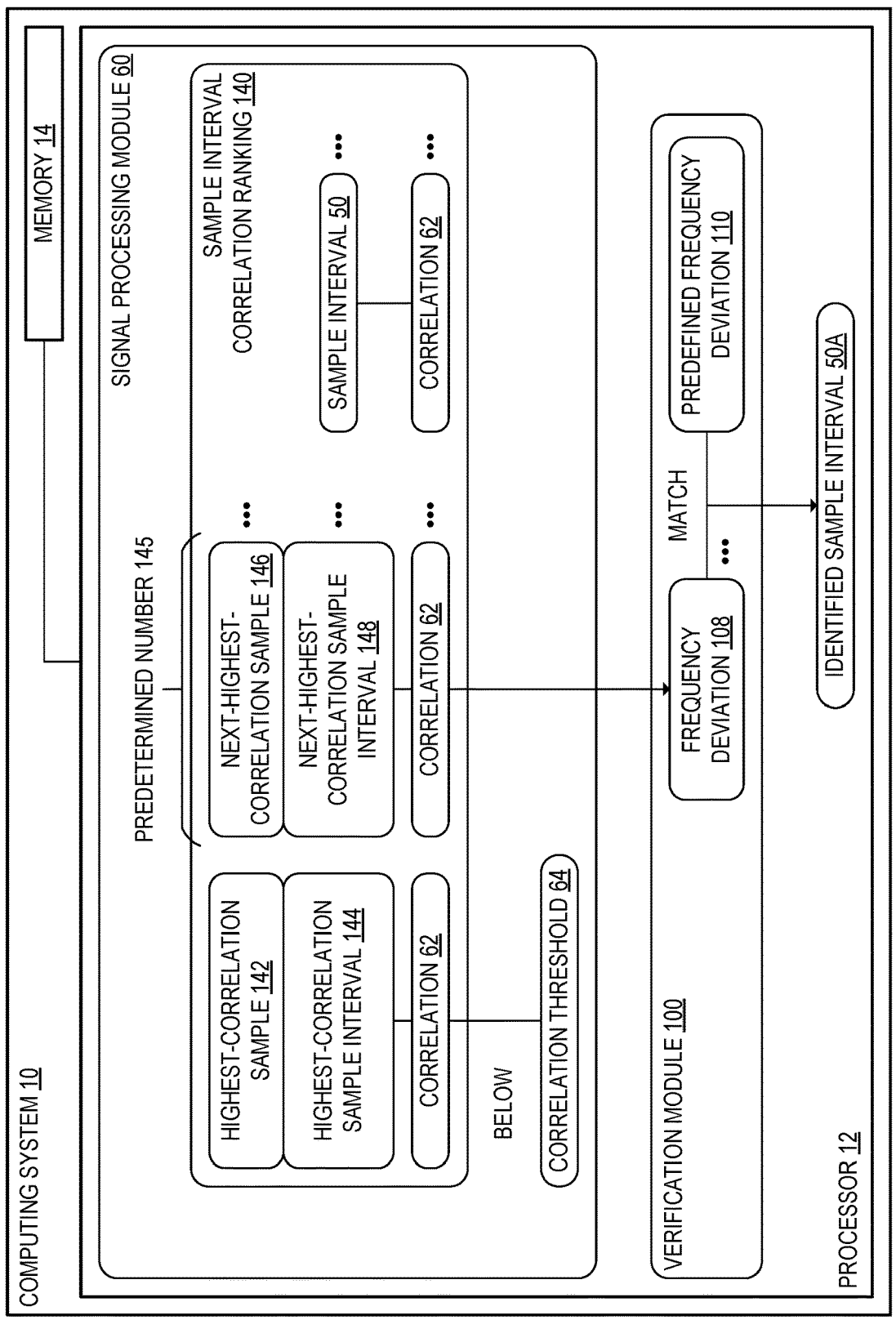
FIG. 8 schematically shows the computing system when the processor is configured to execute the verification module for a plurality of next-highest-correlation samples, according to the example of FIG. 1.

Turning now to FIG. 8, selection of the identified sample interval 50A is schematically depicted in an example in which the satellite downlink signal 22 does not have a correlation 62 with the simulated signal 46 greater than the predetermined correlation threshold 64 in any of the sample intervals 50 into which the satellite downlink signal 22 is divided. In the example of FIG. 8, the processor 12 may be configured to select the identified sample interval 50A at least in part by generating a sample interval correlation ranking 140 in which the plurality of sample intervals 50 are ranked by the correlations 62 of the satellite downlink signal 22 with the simulated signal 46 within those sample intervals 50. In the example of FIG. 8, the sample intervals 50 are ranked in descending order, whereas in other examples, the sample intervals 50 may be ranked in ascending order. The processor 12 may be further configured to determine that a highest-correlation sample 142 located within a highest-correlation sample interval 144 of the plurality of sample intervals 50 does not have a respective correlation 62 above the predetermined correlation threshold 64. Thus, in the example of FIG. 8, none of the samples of the satellite downlink signal 22 exceed the predetermined correlation threshold 64.

In response to determining that the highest-correlation sample 142 does not have a correlation 62 above the predetermined correlation threshold 64, the processor 12 may be further configured to perform frequency deviation checking at the verification module 100 for each of a predetermined number 145 of next-highest-correlation samples 146 located within respective next-highest-correlation sample intervals 148. As one example, the processor 12 may be further configured to perform frequency deviation checking for the next five highest-correlation samples after the highest-correlation sample 142. For each of the next-highest-correlation samples 146, the processor 12 may be further configured to compute a respective frequency-domain signal sample 104 based at least in part on the next-highest-correlation sample 142. The processor 12 may be further configured to compute a respective frequency deviation 108 of each of the frequency-domain signal samples 104. The processor 12 may be further configured to select, as the identified sample 22A, a next-highest-correlation sample 142 of the predetermined number 145 of next-highest-correlation samples 142 that has a frequency deviation 108 substantially equal to the predefined frequency deviation 110. Accordingly, when the predetermined correlation threshold 64 is high, the processor 12 may be configured to check high-correlation intervals of the satellite downlink signal 22 for packets 80 even though none of the sample intervals 50 surpass the predetermined correlation threshold 64.

FIG. 9 shows an example satellite signal decoding algorithm 200 that may be performed at the processor 12 of the computing system 10 to locate and decode a packet 80 in a satellite downlink signal 22. In the example satellite signal decoding algorithm 200 of FIG. 9, the processor 12 may be configured to generate the simulated signal 46 from the satellite-specific packet metadata 40. The processor 12 may be further configured to iteratively compute, for a plurality of sample intervals 50, respective correlations 62 in the time domain between the simulated signal 46 and the satellite downlink signal 22. In the example satellite signal decoding algorithm 200 of FIG. 9, the correlations 62 are stored in a heap.

When at least one correlation 62 surpasses the predetermined correlation threshold 64, the processor 12 may be further configured to map the corresponding identified sample interval 50A to an identified sample 22A of the satellite downlink signal 22 that is estimated to be the location of a packet 80. The identified sample 22A may, for example, be a highest-correlation sample 142 included in the satellite downlink signal 22. The processor 12 may be further configured to estimate a frequency deviation 108 within the identified sample 22A as a check for whether the identified sample 22A includes a packet 80. The frequency deviation 108 may indicate that the identified sample 22A includes a packet 80 when the frequency deviation 108 is substantially equal to a predefined frequency deviation 110.

When none of the correlations 62 surpass the predetermined correlation threshold 64, the processor 12 may instead be configured to estimate respective frequency deviations 108 within a predetermined number 145 of next-highest-correlation samples 146. In the example of FIG. 9, five next-highest-correlation samples 146 are checked. If a next-highest-correlation sample 146 has a frequency deviation 108 substantially equal to the predefined frequency deviation 110, the processor 12 may be configured to select that next-highest-correlation sample 146 as the identified sample 22A. The processor 12 may be further configured to update the predetermined correlation threshold 64 to the correlation 62 of the next-highest-correlation sample 146 selected as the identified sample 22A. If none of the next-highest-correlation samples 146 have frequency deviations 108 that match the predefined frequency deviation 110, the processor 12 may instead be configured to stop checking the satellite downlink signal 22 for packets 80.

When the processor 12 checks the correlations 62 of the plurality of sample intervals 50 and further checks the frequency deviations 108 within at least a subset of the plurality of sample intervals 50, the processor 12 may be further configured to update the predetermined correlation threshold 64. In addition, the processor 12 may be further configured to recompute the interval size 52. The processor 12 may be further configured to carry over an updated value of the predetermined correlation threshold 64 to future instances in which the satellite signal decoding algorithm 200 is executed.

The processor 12 may be further configured to decode the identified sample 22A of the satellite downlink signal 22 at a plurality of starting locations 122 within the identified sample 22A to obtain a plurality of candidate decoded preambles 124. The processor 12 may be further configured to identify a candidate decoded preamble 124 that matches the packet preamble binary data 42 included in the satellite-specific packet metadata 40 and may thereby select an identified starting location 122A. Subsequently to selecting the identified starting location 122A, the processor 12 may be further configured to decode the entire packet 80 starting at the identified starting location 122A. Thus, the processor 12 may be configured to obtain the binary satellite signal data 70 as an output of the satellite signal decoding algorithm 200.

Figure 10A:
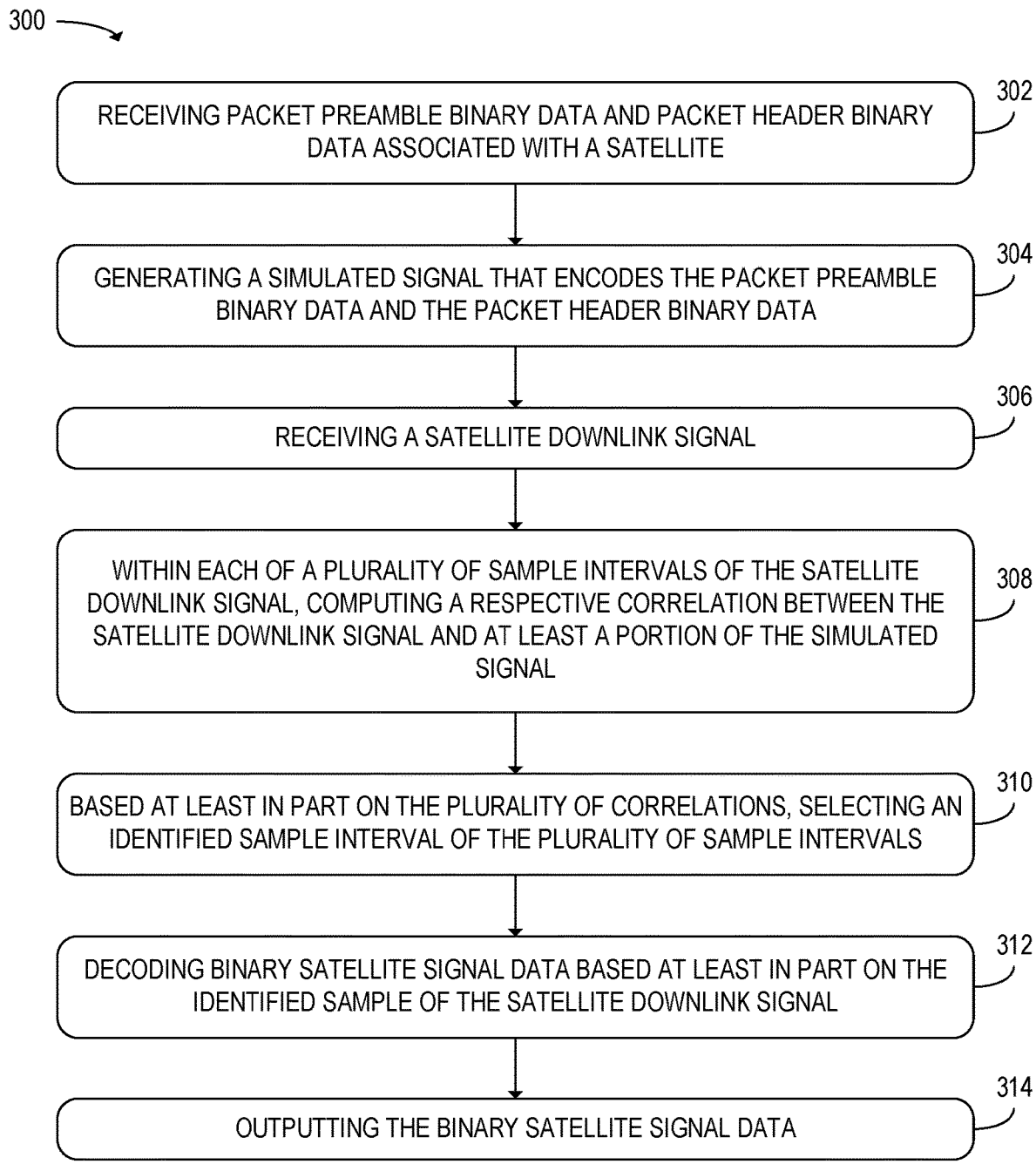
FIG. 10A shows a flowchart of an example method that may be performed at a computing system to decode a satellite downlink signal, according to the example of FIG. 1.

FIG. 10A shows a flowchart of an example method 300 that may be performed at a computing system configured to communicate with a ground station. At step 302, the method 300 may include receiving packet preamble binary data and packet header binary data associated with a satellite. The satellite may be a CubeSat included in a satellite constellation, and thus may be formed of one or more standard units having a useful volume of less than or equal to 1 liter and a mass of less than or equal to 2 kg. The satellite may have a form factor of 1-12 standard units, with 3 units being a typical size. The packet preamble binary data and the packet header binary data may be computed from specifications of a protocol via which the satellite is configured to communicate with the ground station.

At step 304, the method 300 may further include generating a simulated signal that encodes the packet preamble binary data and the packet header binary data. The simulated signal may be a noise-free version of a signal in which the packet preamble binary data and the packet header binary data have been encoded according to the communication protocol used at the satellite.

At step 306, the method 300 may further include receiving a satellite downlink signal from the satellite.

At step 308, the method 300 may further include, within each of a plurality of sample intervals of the satellite downlink signal, computing a respective correlation between the satellite downlink signal and at least a portion of the simulated signal. Each correlation may, for example, be a linear correlation. The plurality of sample intervals may cover the entire temporal range of the satellite downlink signal received at the processor 12. In some examples, the sample intervals for which the correlations are computed may each have the same interval size.

At step 310, the method 300 may further include selecting an identified sample interval of the plurality of sample intervals based at least in part on the plurality of correlations. For example, the identified sample interval may be a sample interval within which the satellite downlink signal has the highest correlation with the simulated signal.

At step 312, the method 300 may further include decoding binary satellite signal data based at least in part on the identified sample of the satellite downlink signal. The binary satellite signal data may be decoded according to the communication protocol used by the satellite and the ground station. At step 314, the method 300 may further include outputting the binary satellite signal data.

Figure 10B:
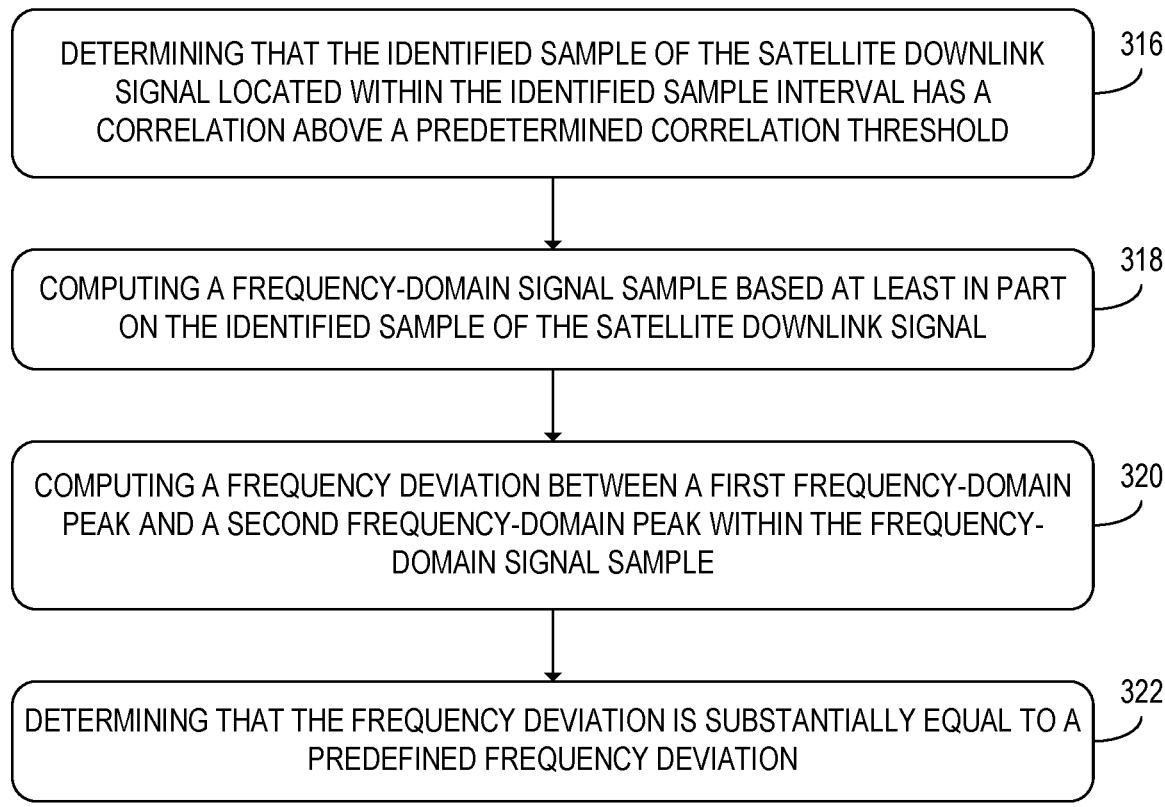
FIGS. 10B-10G show additional steps of the method of FIG. 10A that may be performed in some examples.

FIG. 10B shows additional steps of the method 300 that may be performed when selecting the identified sample interval at step 310. At step 316, the method 300 may further include determining that the identified sample of the satellite downlink signal located within the identified sample interval has a correlation above a predetermined correlation threshold.

At step 318, the method 300 may further include computing a frequency-domain signal sample based at least in part on the identified sample of the satellite downlink signal. The frequency-domain signal sample may be computed by performing a fast Fourier transform on the identified sample. At step 320, the method 300 may further include computing a frequency deviation between a first frequency-domain peak and a second frequency-domain peak within the frequency-domain signal sample. At step 322, the method 300 may further include determining that the frequency deviation is substantially equal to a predefined frequency deviation. A frequency deviation that matches the predefined frequency deviation may indicate that the identified sample encodes a packet.

Figure 10C:
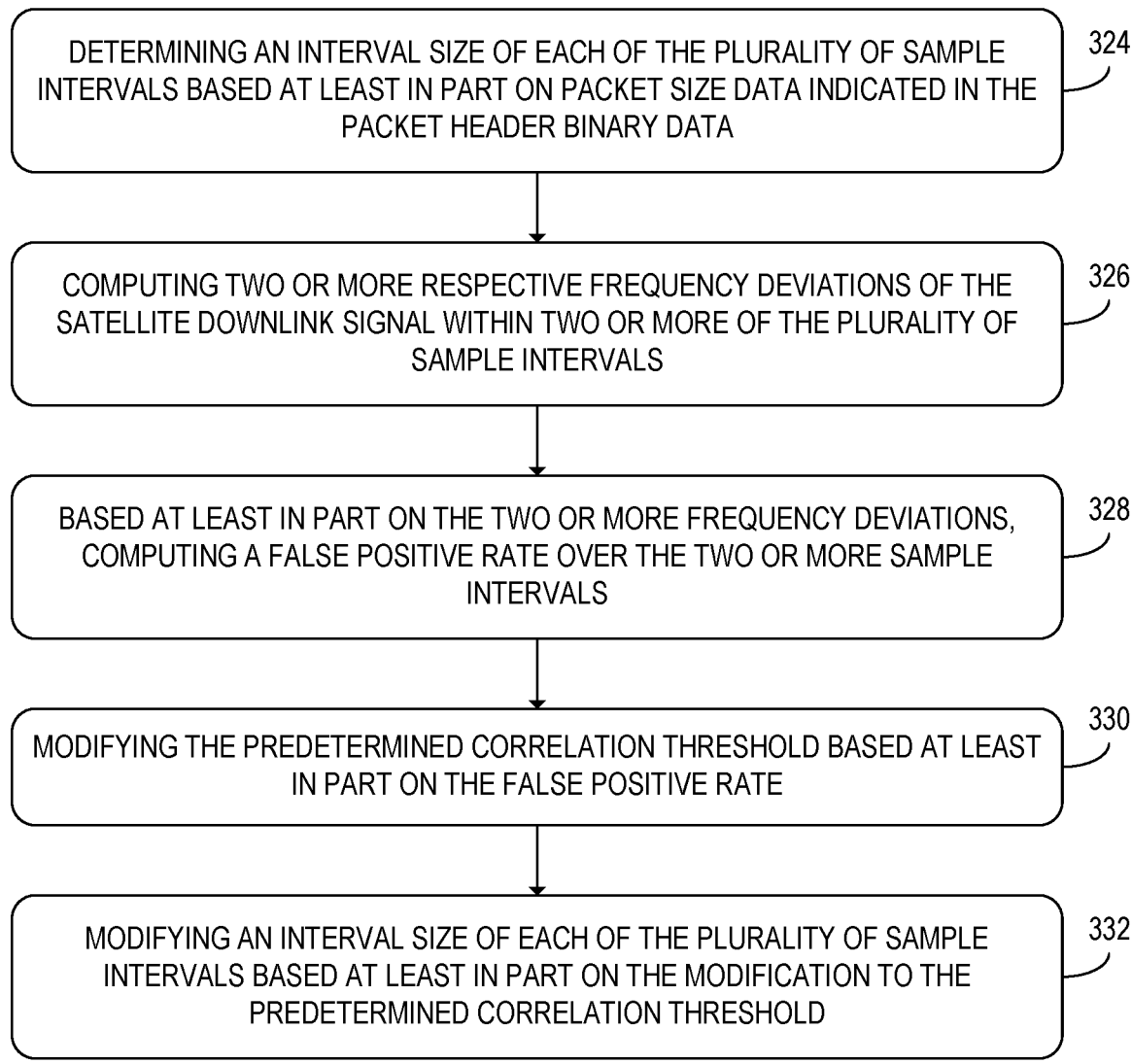

FIG. 10C shows additional steps of the method 300 that may be performed in some examples to set the predetermined correlation threshold and the interval size. In some examples, the method 300 may further include, at step 324, determining the interval size of each of the plurality of sample intervals based at least in part on packet size data indicated in the packet header binary data. Step 324 may be performed subsequently to receiving the packet preamble binary data and packet header data at step 302 and prior to receiving the satellite downlink signal at step 306.

At step 326, the method 300 may further include computing two or more respective frequency deviations of the satellite downlink signal within two or more of the plurality of sample intervals. As discussed below, the two or more frequency deviations may be computed in examples in which frequency deviation checking is performed for one or more additional sample intervals that are spaced apart from the identified sample interval by predefined distances.

At step 328, the method 300 may further include computing a false positive rate over the two or more sample intervals. At step 330, the method 300 may further include modifying the predetermined correlation threshold based at least in part on the false positive rate. The predetermined correlation threshold may be increased when the false positive rate is high (e.g., when the false positive rate exceeds a false positive rate threshold) and decreased when the false positive rate is low (e.g., when the false positive rate is below the false positive rate threshold).

At step 332, the method 300 may further include modifying an interval size of each of the plurality of sample intervals based at least in part on the modification to the predetermined correlation threshold. The interval size may be increased when the predetermined correlation threshold is decreased and may be decreased when the predetermined correlation threshold is increased. Increasing or decreasing the interval size when the predetermined correlation threshold changes may allow the computing system to adjust a balance between the false positive rate and the false negative rate. When the interval size is modified, the modified interval size may be used in one or more subsequent executions of the satellite signal decoding algorithm.

Figure 10D:
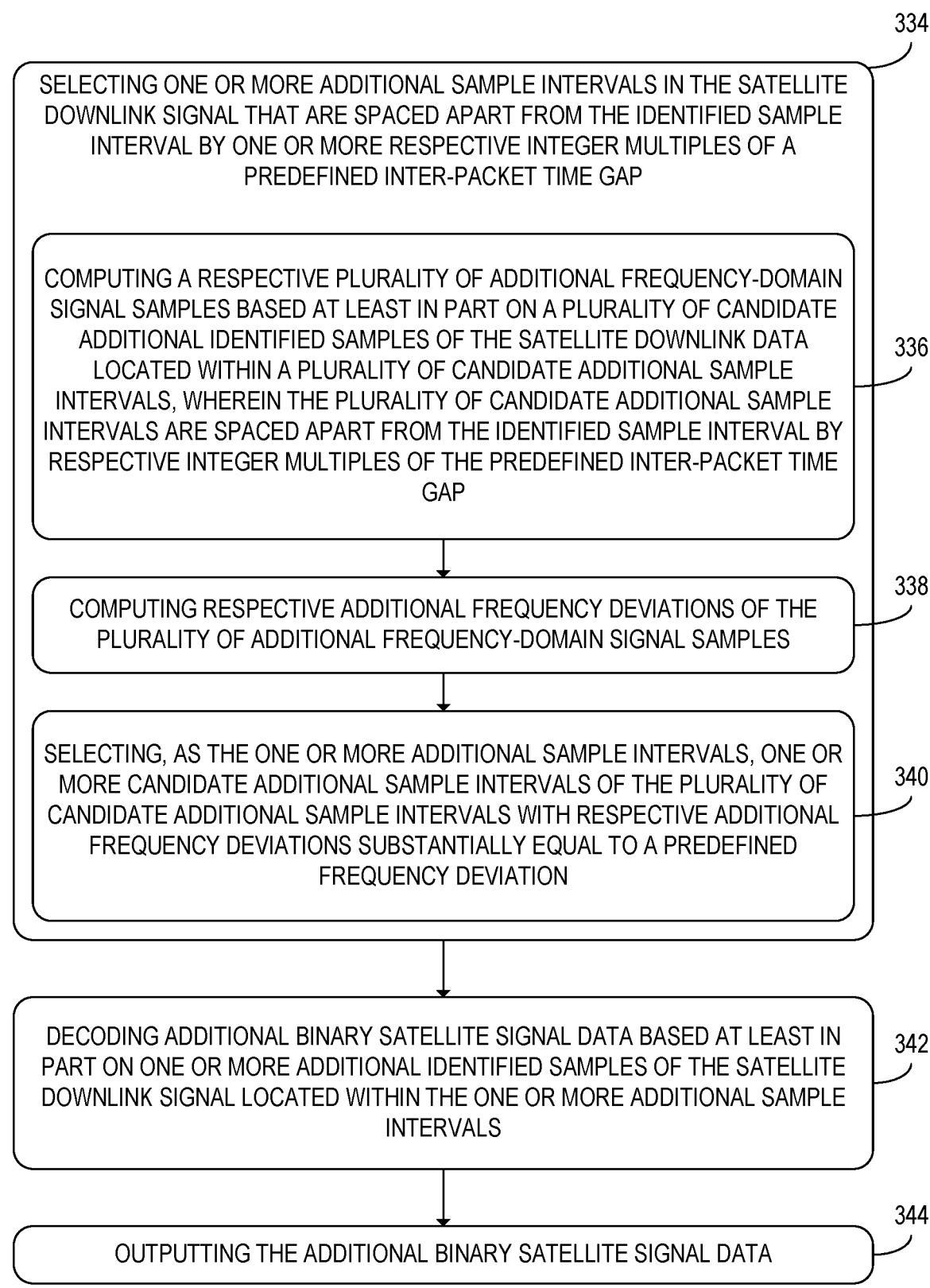

FIG. 10D shows additional steps of the method 300 that may be performed in some examples after decoding the binary satellite signal data of the identified sample at step 314. At step 334, the method 300 may further include selecting one or more additional sample intervals in the satellite downlink signal that are spaced apart from the identified sample interval by one or more respective integer multiples of a predefined inter-packet time gap. The predefined inter-packet time gap may, for example, be specified in the communication protocol used at the satellite. Thus, the locations of one or more additional packets in the satellite downlink signal may be identified.

Step 334 may include, at step 336, computing a respective plurality of additional frequency-domain signal samples based at least in part on a plurality of candidate additional identified samples of the satellite downlink data located within a plurality of candidate additional sample intervals. The plurality of candidate additional sample intervals may be spaced apart from the identified sample interval by respective integer multiples of the predefined inter-packet time gap. The candidate additional sample intervals may accordingly be predicted locations of additional packets. At step 338, step 334 may further include computing respective additional frequency deviations of the plurality of additional frequency-domain signal samples. At step 340, step 334 may further include selecting, as the one or more additional sample intervals, one or more candidate additional sample intervals of the plurality of candidate additional sample intervals with respective additional frequency deviations substantially equal to the predefined frequency deviation. Thus, the frequency deviations of the candidate additional identified samples may be checked to determine whether the candidate additional identified samples encode packets.

At step 342, the method 300 may further include decoding additional binary satellite signal data based at least in part on one or more additional identified samples of the satellite downlink signal located within the one or more additional sample intervals. At step 344, the method 300 may further include outputting the additional binary satellite signal data.

Figure 10E:
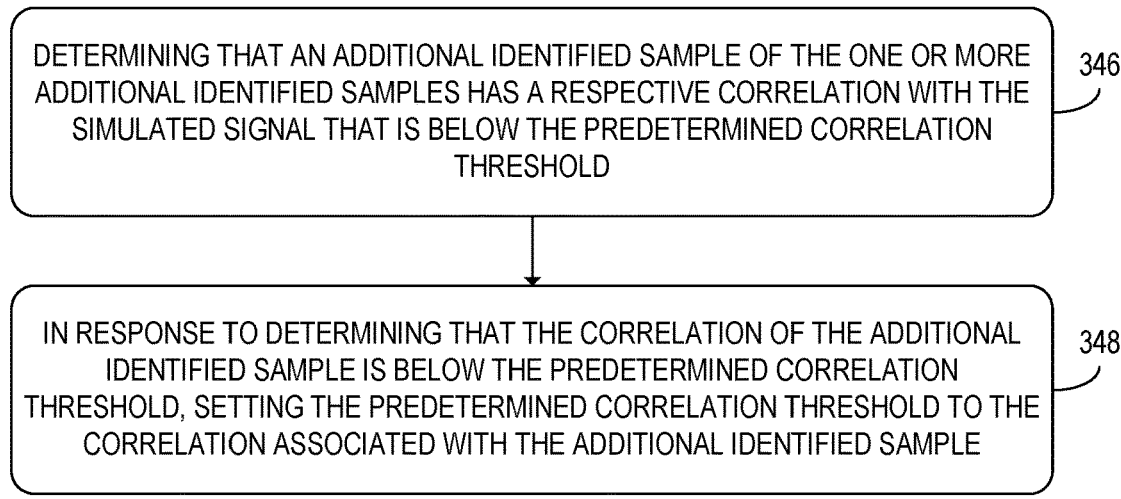

FIG. 10E shows additional steps of the method 300 that may be performed in some examples in which the steps of FIG. 10D are performed. At step 346, the method 300 may further include determining that an additional identified sample of the one or more additional identified samples has a respective correlation with the simulated signal that is below the predetermined correlation threshold. Thus, the additional identified sample may be a false positive. At step 348, in response to determining that the correlation of the additional identified sample is below the predetermined correlation threshold, the method 300 may further include setting the predetermined correlation threshold to the correlation associated with the additional identified sample. Accordingly, when an additional identified sample is determined to have a frequency deviation that matches the predefined frequency deviation without the correlation for that additional identified sample, exceeding the predetermined correlation threshold, the predetermined correlation threshold may be lowered.

Figure 10F:
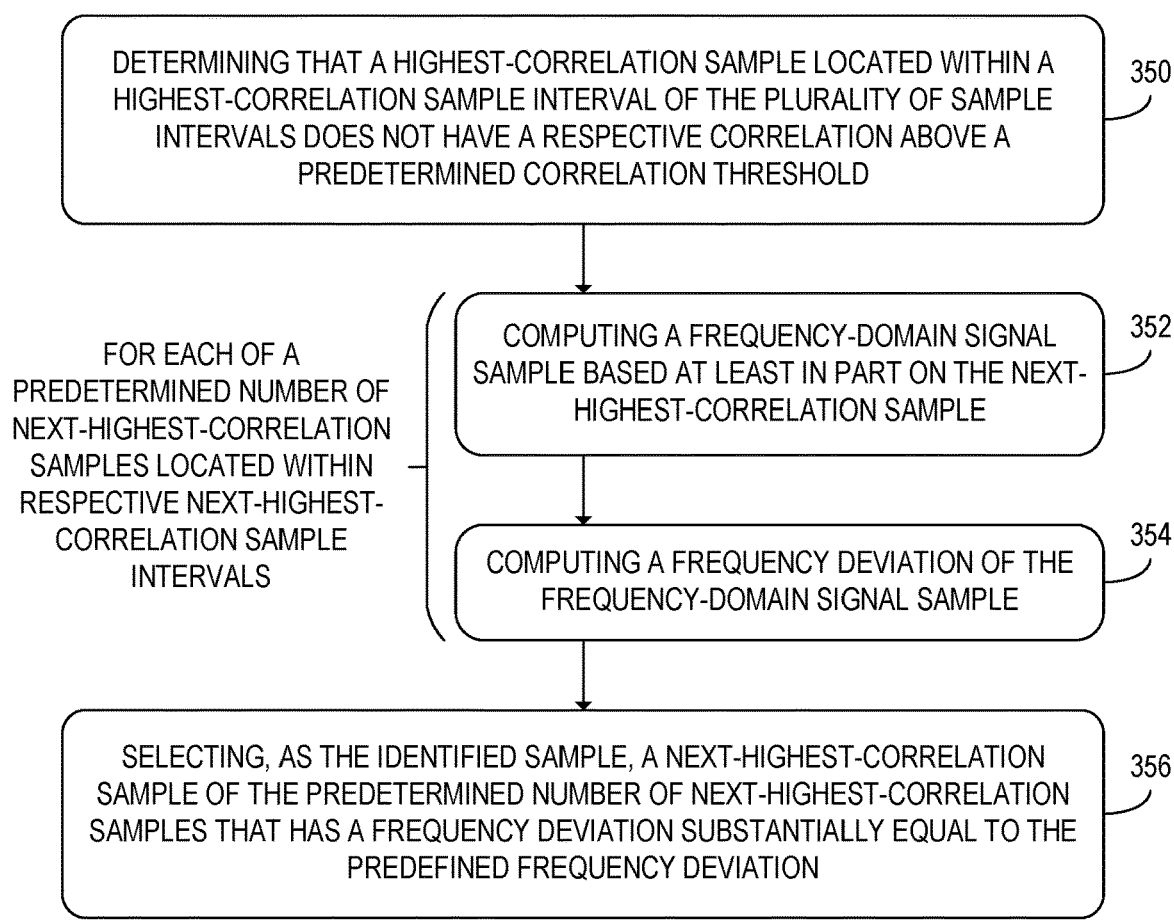

FIG. 10F shows additional steps of the method 300 that may be performed in some examples when selecting the identified sample interval at step 310. At step 350, the method 300 may further include determining that a highest-correlation sample located within a highest-correlation sample interval of the plurality of sample intervals does not have a respective correlation above a predetermined correlation threshold. Thus, in examples in which step 350 is performed, none of the samples exceed the predetermined correlation threshold.

Steps 352 and 354 may be performed for each of a predetermined number of next-highest-correlation samples located within respective next-highest-correlation sample intervals. As one example, steps 352 and 354 may be performed for the samples with the next five highest correlations with the simulated signal. At step 352, the method 300 may further include computing a frequency-domain signal sample based at least in part on the next-highest-correlation sample. At step 354, the method 300 may further include computing a frequency deviation of the frequency-domain signal sample.

At step 356, the method 300 may further include selecting, as the identified sample, a next-highest-correlation sample of the predetermined number of next-highest-correlation samples that has a frequency deviation substantially equal to a predefined frequency deviation. In some examples, multiple next-highest correlation samples may have frequency deviations substantially equal to the predefined frequency deviation. In such examples, the next-highest-correlation sample with the highest correlation with the simulated signal may be selected as the identified sample.

Figure 10G:
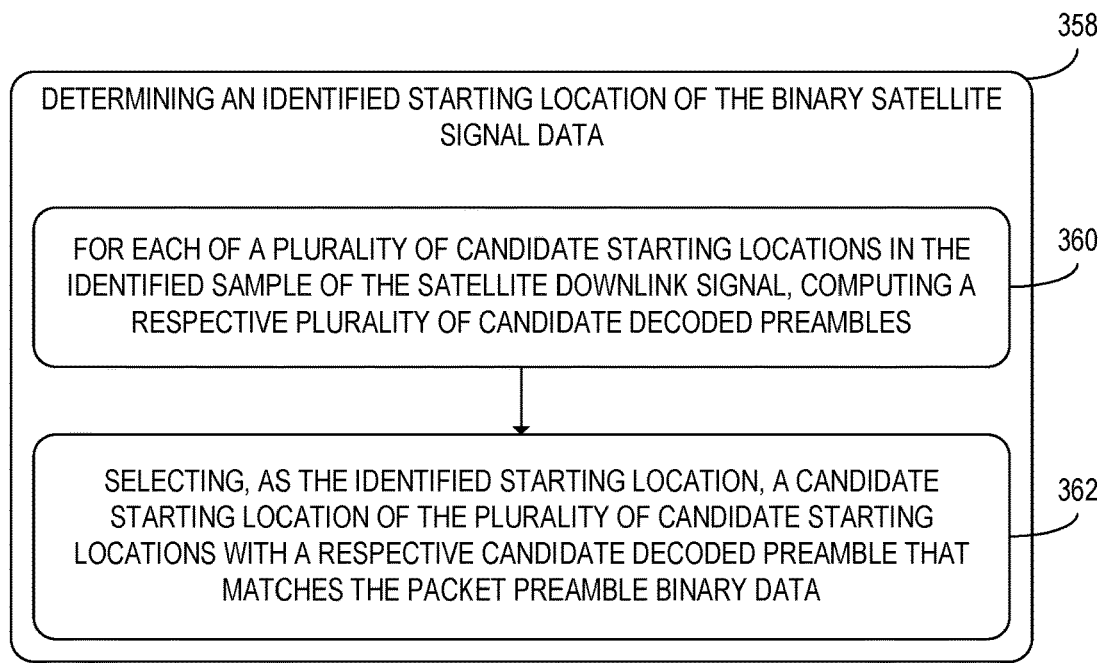

FIG. 10G shows additional steps of the method 300 that may be performed in some examples. At step 358, the method 300 may further include determining an identified starting location of the binary satellite signal data. The identified starting location may be a location within the identified sample at which a packet begins. At step 360, step 358 may include, for each of a plurality of candidate starting locations in the identified sample of the satellite downlink signal, computing a respective plurality of candidate decoded preambles. At step 362, step 358 may further include selecting, as the identified starting location, a candidate starting location of the plurality of candidate starting locations with a respective candidate decoded preamble that matches the packet preamble binary data. Thus, the specific location at which the packet begins may be identified by decoding portions of the identified sample and detecting the binary sequence of the packet preamble.

Using the systems and methods discussed above, satellite downlink data received from CubeSats or from other lowtransmission-power satellites may be decoded in a manner that allows packets to be distinguished from noise more reliably. Thus, the signal-to-noise ratio of the signals received from satellites may be increased and larger amounts of usable data may be obtained.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
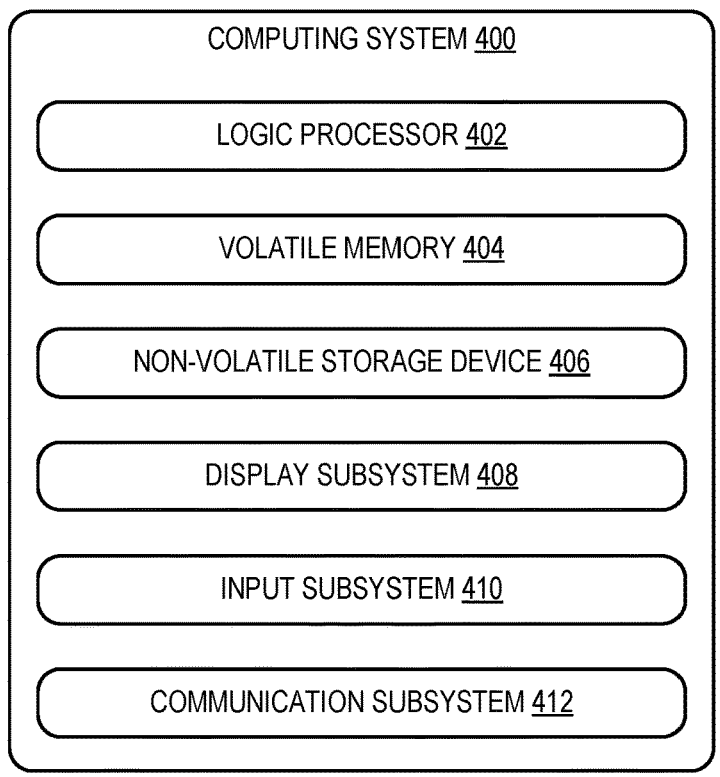
FIG. 11 shows a schematic view of an example computing environment in which the computing system of FIG. 1 may be instantiated.

FIG. 11 schematically shows a non-limiting embodiment of a computing system 400 that can enact one or more of the methods and processes described above. Computing system 400 is shown in simplified form. Computing system 400 may embody the computing system 10 described above and illustrated in FIG. 1. Components of the computing system 400 may be instantiated in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 1.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

The following paragraphs discuss several aspects of the present disclosure. According to one aspect of the present disclosure, a computing system is provided, including a processor configured to receive packet preamble binary data and packet header binary data associated with a satellite. The processor may be further configured to generate a simulated signal that encodes the packet preamble binary data and the packet header binary data. The processor may be further configured to receive a satellite downlink signal. Within each of a plurality of sample intervals of the satellite downlink signal, the processor may be further configured to compute a respective correlation between the satellite downlink signal and at least a portion of the simulated signal. Based at least in part on the plurality of correlations, the processor may be further configured to select an identified sample interval of the plurality of sample intervals. The processor may be further configured to decode binary satellite signal data based at least in part on an identified sample of the satellite downlink signal located within the identified sample interval. The processor may be further configured to output the binary satellite signal data.

According to this aspect, the processor may be configured to select the identified sample interval at least in part by determining that the identified sample of the satellite downlink signal located within the identified sample interval has a correlation above a predetermined correlation threshold.

According to this aspect, the processor may be configured to select the identified sample interval at least in part by computing a frequency-domain signal sample based at least in part on the identified sample of the satellite downlink signal. Selecting the identified sample interval may further include computing a frequency deviation between a first frequency-domain peak and a second frequency-domain peak within the frequency-domain signal sample. Selecting the identified sample interval may further include determining that the frequency deviation is substantially equal to a predefined frequency deviation.

According to this aspect, the processor may be further configured to compute two or more respective frequency deviations of the satellite downlink signal within two or more of the plurality of sample intervals. Based at least in part on the two or more frequency deviations, the processor may be further configured to compute a false positive rate over the two or more sample intervals. The processor may be further configured to modify the predetermined correlation threshold based at least in part on the false positive rate.

According to this aspect, the processor may be further configured to modify an interval size of each of the plurality of sample intervals based at least in part on the modification to the predetermined correlation threshold.

According to this aspect, the processor may be further configured to select one or more additional sample intervals in the satellite downlink signal that are spaced apart from the identified sample interval by one or more respective integer multiples of a predefined inter-packet time gap. The processor may be further configured to decode additional binary satellite signal data based at least in part on one or more additional identified samples of the satellite downlink signal located within the one or more additional sample intervals. The processor may be further configured to output the additional binary satellite signal data.

According to this aspect, the processor may be configured to select the one or more additional sample intervals at least in part by computing a respective plurality of additional frequency-domain signal samples based at least in part on a plurality of candidate additional identified samples of the satellite downlink data located within a plurality of candidate additional sample intervals. The plurality of candidate additional sample intervals may be spaced apart from the identified sample interval by respective integer multiples of the predefined inter-packet time gap. Selecting the one or more additional sample intervals may further include computing respective additional frequency deviations of the plurality of additional frequency-domain signal samples. Selecting the one or more additional sample intervals may further include selecting, as the one or more additional sample intervals, one or more candidate additional sample intervals of the plurality of candidate additional sample intervals with respective additional frequency deviations substantially equal to the predefined frequency deviation.

According to this aspect, the processor may be further configured to determine that an additional identified sample of the one or more additional identified samples has a respective correlation with the simulated signal that is below the predetermined correlation threshold. In response to determining that the correlation of the additional identified sample is below the predetermined correlation threshold, the processor may be further configured to set the predetermined correlation threshold to the correlation associated with the additional identified sample.

According to this aspect, the processor may be configured to select the identified sample interval at least in part by determining that a highest-correlation sample located within a highest-correlation sample interval of the plurality of sample intervals does not have a respective correlation above a predetermined correlation threshold. For each of a predetermined number of next-highest-correlation samples located within respective next-highest-correlation sample intervals, selecting the identified sample interval may further include computing a frequency-domain signal sample based at least in part on the next-highest-correlation sample. For each of the predetermined number of next-highest-correlation samples, selecting the identified sample interval may further include computing a frequency deviation of the frequency-domain signal sample. Selecting the identified sample interval may further include selecting, as the identified sample, a next-highest-correlation sample of the predetermined number of next-highest-correlation samples that has a frequency deviation substantially equal to a predefined frequency deviation.

According to this aspect, the processor may be further configured to determine an identified starting location of the binary satellite signal data at least in part by, for each of a plurality of candidate starting locations in the identified sample of the satellite downlink signal, computing a respective plurality of candidate decoded preambles. Determining the identified starting location may further include selecting, as the identified starting location, a candidate starting location of the plurality of candidate starting locations with a respective candidate decoded preamble that matches the packet preamble binary data.

According to this aspect, the processor may be configured to determine an interval size of each of the plurality of sample intervals based at least in part on packet size data indicated in the packet header binary data.

According to another aspect of the present disclosure, a method for use with a computing system is provided. The method may include receiving packet preamble binary data and packet header binary data associated with a satellite. The method may further include generating a simulated signal that encodes the packet preamble binary data and the packet header binary data. The method may further include receiving a satellite downlink signal. Within each of a plurality of sample intervals of the satellite downlink signal, the method may further include computing a respective correlation between the satellite downlink signal and at least a portion of the simulated signal. Based at least in part on the plurality of correlations, the method may further include selecting an identified sample interval of the plurality of sample intervals. The method may further include decoding binary satellite signal data based at least in part on the identified sample of the satellite downlink signal. The method may further include outputting the binary satellite signal data.

According to this aspect, selecting the identified sample interval may include determining that the identified sample of the satellite downlink signal located within the identified sample interval has a correlation above a predetermined correlation threshold.

According to this aspect, selecting the identified sample interval may further include computing a frequency-domain signal sample based at least in part on the identified sample of the satellite downlink signal. Selecting the identified sample interval may further include computing a frequency deviation between a first frequency-domain peak and a second frequency-domain peak within the frequency-domain signal sample. Selecting the identified sample interval may further include determining that the frequency deviation is substantially equal to a predefined frequency deviation.

According to this aspect, the method may further include selecting one or more additional sample intervals in the satellite downlink signal that are spaced apart from the identified sample interval by one or more respective integer multiples of a predefined inter-packet time gap. The method may further include decoding additional binary satellite signal data based at least in part on one or more additional identified samples of the satellite downlink signal located within the one or more additional sample intervals. The method may further include outputting the additional binary satellite signal data.

According to this aspect, selecting the one or more additional sample intervals may further include computing a respective plurality of additional frequency-domain signal samples based at least in part on a plurality of candidate additional identified samples of the satellite downlink data located within a plurality of candidate additional sample intervals. The plurality of candidate additional sample intervals may be spaced apart from the identified sample interval by respective integer multiples of the predefined inter-packet time gap. Selecting the one or more additional sample intervals may further include computing respective additional frequency deviations of the plurality of additional frequency-domain signal samples. Selecting the one or more additional sample intervals may further include selecting, as the one or more additional sample intervals, one or more candidate additional sample intervals of the plurality of candidate additional sample intervals with respective additional frequency deviations substantially equal to the predefined frequency deviation.

According to this aspect, the method may further include determining that an additional identified sample of the one or more additional identified samples has a respective correlation with the simulated signal that is below the predetermined correlation threshold. In response to determining that the correlation of the additional identified sample is below the predetermined correlation threshold, the method may further include setting the predetermined correlation threshold to the correlation associated with the additional identified sample.

According to this aspect, selecting the identified sample interval may include determining that a highest-correlation sample located within a highest-correlation sample interval of the plurality of sample intervals does not have a respective correlation above a predetermined correlation threshold. Selecting the identified sample interval may further include, for each of a predetermined number of next-highest-correlation samples located within respective next-highest-correlation sample intervals, computing a frequency-domain signal sample based at least in part on the next-highest-correlation sample. Selecting the identified sample interval may further include, for each of the predetermined number of next-highest-correlation samples, computing a frequency deviation of the frequency-domain signal sample. Selecting the identified sample interval may further include selecting, as the identified sample, a next-highest-correlation sample of the predetermined number of next-highest-correlation samples that has a frequency deviation substantially equal to a predefined frequency deviation.

According to this aspect, the method may further include determining an identified starting location of the binary satellite signal data at least in part by, for each of a plurality of candidate starting locations in the identified sample of the satellite downlink signal, computing a respective plurality of candidate decoded preambles. Determining the identified starting location may further include selecting, as the identified starting location, a candidate starting location of the plurality of candidate starting locations with a respective candidate decoded preamble that matches the packet preamble binary data.

According to another aspect of the present disclosure, a computing system is provided, including a processor configured to receive satellite-specific packet metadata associated with a satellite. The processor may be further configured to generate a simulated signal that encodes the satellite-specific packet metadata. The processor may be further configured to receive a satellite downlink signal. Within each of a plurality of sample intervals of the satellite downlink signal, the processor may be further configured to compute a respective correlation between the satellite downlink signal and at least a portion of the simulated signal. Within each of a plurality of sample intervals of the satellite downlink signal, the processor may be further configured to compute a respective correlation between the satellite downlink signal and at least a portion of the simulated signal. The processor may be further configured to determine an identified starting location within the identified sample interval at least in part by, for each of a plurality of candidate starting locations in the identified sample of the satellite downlink signal, computing respective candidate decoded packet metadata. Determining the identified starting location may further include selecting, as the identified starting location, a candidate starting location of the plurality of candidate starting locations with respective candidate decoded packet metadata that matches the satellite-specific packet metadata. Starting at the identified starting location, the processor may be further configured to decode binary satellite signal data based at least in part on the identified sample of the satellite downlink signal. The processor may be further configured to output the binary satellite signal data.

"And/or" as used herein is defined as the inclusive or ∨, as specified by the following truth table:

| A | B | A ∨ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
   memory; and
   a processor that is communicatively coupled to the memory and is configured to:
      receive satellite-specific packet metadata associated with a satellite;
      generate a simulated signal that encodes the satellite-specific packet metadata;
      receive a satellite downlink signal;
      within each of a plurality of sample intervals of the satellite downlink signal, compute a respective correlation between the satellite downlink signal and at least a portion of the simulated signal;
      based at least in part on the plurality of correlations, select an identified sample interval of the plurality of sample intervals;
      compute a frequency deviation of an identified sample of the satellite downlink signal located within the identified sample interval;
      determine that the frequency deviation is substantially equal to a predefined frequency deviation;
      subsequently to determining that the frequency deviation is substantially equal to a predefined frequency deviation, decode binary satellite signal data based at least in part on the identified sample of the satellite downlink signal; and
      output the binary satellite signal data.

2. The computing system of claim 1, wherein the processor is configured to select the identified sample interval at least in part by determining that the identified sample of the satellite downlink signal located within the identified sample interval has a correlation above a predetermined correlation threshold.

3. The computing system of claim 2, wherein the processor is further configured to:
   compute a frequency-domain signal sample based at least in part on the identified sample of the satellite downlink signal; and
   compute the frequency deviation between a first frequency-domain peak and a second frequency-domain peak within the frequency-domain signal sample.

4. The computing system of claim 3, wherein the processor is further configured to:
   compute two or more respective frequency deviations of the satellite downlink signal within two or more of the plurality of sample intervals; and
   based at least in part on the two or more frequency deviations, compute a false positive rate over the two or more sample intervals.

5. The computing system of claim 4, wherein the processor is further configured to:
   select another identified sample interval of the two or more sample intervals;
   determine that another identified sample located within the another identified sample interval is a false positive; and
   in response to determining that the another identified sample is a false positive, increase the predetermined correlation threshold.

6. The computing system of claim 4, wherein the processor is further configured to decrease the predetermined correlation threshold in response to determining that the frequency deviation of the identified sample is substantially equal to the predefined frequency deviation.

7. The computing system of claim 4, wherein the processor is further configured to:
   select another identified sample interval of the two or more sample intervals;
   determine that another identified sample located within the another identified sample interval is a false positive; and
   in response to determining that the another identified sample is a false positive, increase an interval size of the sample intervals.

8. The computing system of claim 4, wherein the processor is further configured to decrease an interval size of the sample intervals in response to determining that the frequency deviation of the identified sample is substantially equal to the predefined frequency deviation.

9. The computing system of claim 3, wherein the processor is further configured to:
   select one or more additional sample intervals in the satellite downlink signal that are spaced apart from the identified sample interval by one or more respective integer multiples of a predefined inter-packet time gap;
   decode additional binary satellite signal data based at least in part on one or more additional identified samples of the satellite downlink signal located within the one or more additional sample intervals; and
   output the additional binary satellite signal data.

10. The computing system of claim 9, wherein the processor is configured to select the one or more additional sample intervals at least in part by:
   computing a respective plurality of additional frequency-domain signal samples based at least in part on a plurality of candidate additional identified samples of the satellite downlink data located within a plurality of candidate additional sample intervals, wherein the plurality of candidate additional sample intervals are spaced apart from the identified sample interval by respective integer multiples of the predefined inter-packet time gap;

computing respective additional frequency deviations of the plurality of additional frequency-domain signal samples; and selecting, as the one or more additional sample intervals, one or more candidate additional sample intervals of the plurality of candidate additional sample intervals with respective additional frequency deviations substantially equal to the predefined frequency deviation.

11. The computing system of claim 2, wherein the processor is configured to select the identified sample interval at least in part by:

determining that a highest-correlation sample located within a highest-correlation sample interval of the plurality of sample intervals does not have a respective correlation above the predetermined correlation threshold;

for each of a predetermined number of next-highest-correlation samples located within respective next-highest-correlation sample intervals:

computing a frequency-domain signal sample based at least in part on the next-highest-correlation sample; and computing a frequency deviation of the frequency-domain signal sample; and selecting, as the identified sample, a next-highest-correlation sample of the predetermined number of next-highest-correlation samples that has a frequency deviation substantially equal to the predefined frequency deviation.

12. A method for use with a computing system, the method comprising:

receiving satellite-specific packet metadata associated with a satellite;

generating a simulated signal that encodes the satellite-specific packet metadata;

receiving a satellite downlink signal;

within each of a plurality of sample intervals of the satellite downlink signal, computing a respective correlation between the satellite downlink signal and at least a portion of the simulated signal;

based at least in part on the plurality of correlations, selecting an identified sample interval of the plurality of sample intervals;

computing a frequency deviation of an identified sample of the satellite downlink signal located within the identified sample interval;

determining that the frequency deviation is substantially equal to a predefined frequency deviation;

subsequently to determining that the frequency deviation is substantially equal to a predefined frequency deviation, decoding binary satellite signal data based at least in part on the identified sample of the satellite downlink signal; and outputting the binary satellite signal data.

13. The method of claim 12, wherein selecting the identified sample interval includes determining that the identified sample of the satellite downlink signal located within the identified sample interval has a correlation above a predetermined correlation threshold.

14. The method of claim 13, further comprising:

computing a frequency-domain signal sample based at least in part on the identified sample of the satellite downlink signal; and computing the frequency deviation between a first frequency-domain peak and a second frequency-domain peak within the frequency-domain signal sample.

15. The method of claim 14, further comprising:

computing two or more respective frequency deviations of the satellite downlink signal within two or more of the plurality of sample intervals; and based at least in part on the two or more frequency deviations, computing a false positive rate over the two or more sample intervals.

16. The method of claim 15, further comprising:

selecting another identified sample interval of the two or more sample intervals;

determining that another identified sample located within the another identified sample interval is a false positive; and in response to determining that the another identified sample is a false positive, increasing the predetermined correlation threshold.

17. The method of claim 15, further comprising decreasing the predetermined correlation threshold in response to determining that the frequency deviation of the identified sample is substantially equal to the predefined frequency deviation.

18. The method of claim 15, further comprising:

selecting another identified sample interval of the two or more sample intervals;

determining that another identified sample located within the another identified sample interval is a false positive; and in response to determining that the another identified sample is a false positive, increasing an interval size of the sample intervals.

19. The method of claim 15, further comprising decreasing an interval size of the sample intervals in response to determining that the frequency deviation of the identified sample is substantially equal to the predefined frequency deviation.

20. A computing system comprising:

memory; and a processor that is communicatively coupled to the memory and is configured to:

receive satellite-specific packet metadata associated with a satellite;

generate a simulated signal that encodes the satellite-specific packet metadata;

receive a satellite downlink signal;

within each of a plurality of sample intervals of the satellite downlink signal, compute a respective correlation between the satellite downlink signal and at least a portion of the simulated signal;

based at least in part on the plurality of correlations, select an identified sample interval of the plurality of sample intervals;

compute a frequency deviation of an identified sample of the satellite downlink signal located within the identified sample interval, wherein computing the frequency deviation includes:

computing a frequency-domain signal sample based at least in part on the identified sample of the satellite downlink signal; and computing the frequency deviation between a first frequency-domain peak and a second frequency-domain peak within the frequency-domain signal sample;
determine that the frequency deviation is substantially equal to a predefined frequency deviation;
subsequently to determining that the frequency deviation is substantially equal to a predefined frequency deviation, decode binary satellite signal data based at least in part on the identified sample of the satellite downlink signal;
select one or more additional sample intervals in the satellite downlink signal that are spaced apart from the identified sample interval by one or more respective integer multiples of a predefined inter-packet time gap;
decode additional binary satellite signal data based at least in part on one or more additional identified samples of the satellite downlink signal located within the one or more additional sample intervals; and
output the binary satellite signal data and the additional binary satellite signal data.

* * * * *